United States Patent
Noguchi

(10) Patent No.: US 8,358,877 B2
(45) Date of Patent: Jan. 22, 2013

(54) APPARATUS, PROCESS, AND PROGRAM FOR IMAGE ENCODING

(75) Inventor: Yukinori Noguchi, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 170 days.

(21) Appl. No.: 13/033,822

(22) Filed: Feb. 24, 2011

(65) Prior Publication Data

US 2011/0243470 A1    Oct. 6, 2011

(30) Foreign Application Priority Data

Mar. 31, 2010   (JP) ................... 2010-083551

(51) Int. Cl.
*G06K 9/32* (2006.01)
(52) U.S. Cl. ......... 382/298; 382/236; 382/243; 382/286
(58) Field of Classification Search .................. 382/108, 382/232, 236, 240, 243, 251, 286, 298, 299
See application file for complete search history.

(56) References Cited

U.S. PATENT DOCUMENTS

| | | | | |
|---|---|---|---|---|
| 7,167,601 B2 * | 1/2007 | Kuramoto | ..................... | 382/298 |
| 7,697,782 B2 * | 4/2010 | Pan | .............................. | 382/275 |
| 7,801,337 B2 | 9/2010 | Akahori et al. | | |
| 8,150,213 B2 * | 4/2012 | Kido | .............................. | 382/294 |
| 2009/0202169 A1 | 8/2009 | Hayashi | | |

FOREIGN PATENT DOCUMENTS

JP    2004-193968 A    7/2004

* cited by examiner

*Primary Examiner* — Phuoc Tran
(74) *Attorney, Agent, or Firm* — Birch, Stewart, Kolasch & Birch, LLP

(57) ABSTRACT

In an image encoding process for encoding data of an inputted image and outputting encoded image data: an image-size condition including image size and target sharpness is stored in an image-size-condition storage; a reduced image of the inputted image having the above image size included in the image-size condition stored in the image-size-condition storage is produced; and the sharpness of the reduced image is calculated. When the calculated sharpness of the reduced image is higher than the target sharpness, the image size included in the image-size condition stored in the image-size-condition storage is reduced, and a further reduced image of the inputted image having the reduced image size is produced.

18 Claims, 18 Drawing Sheets

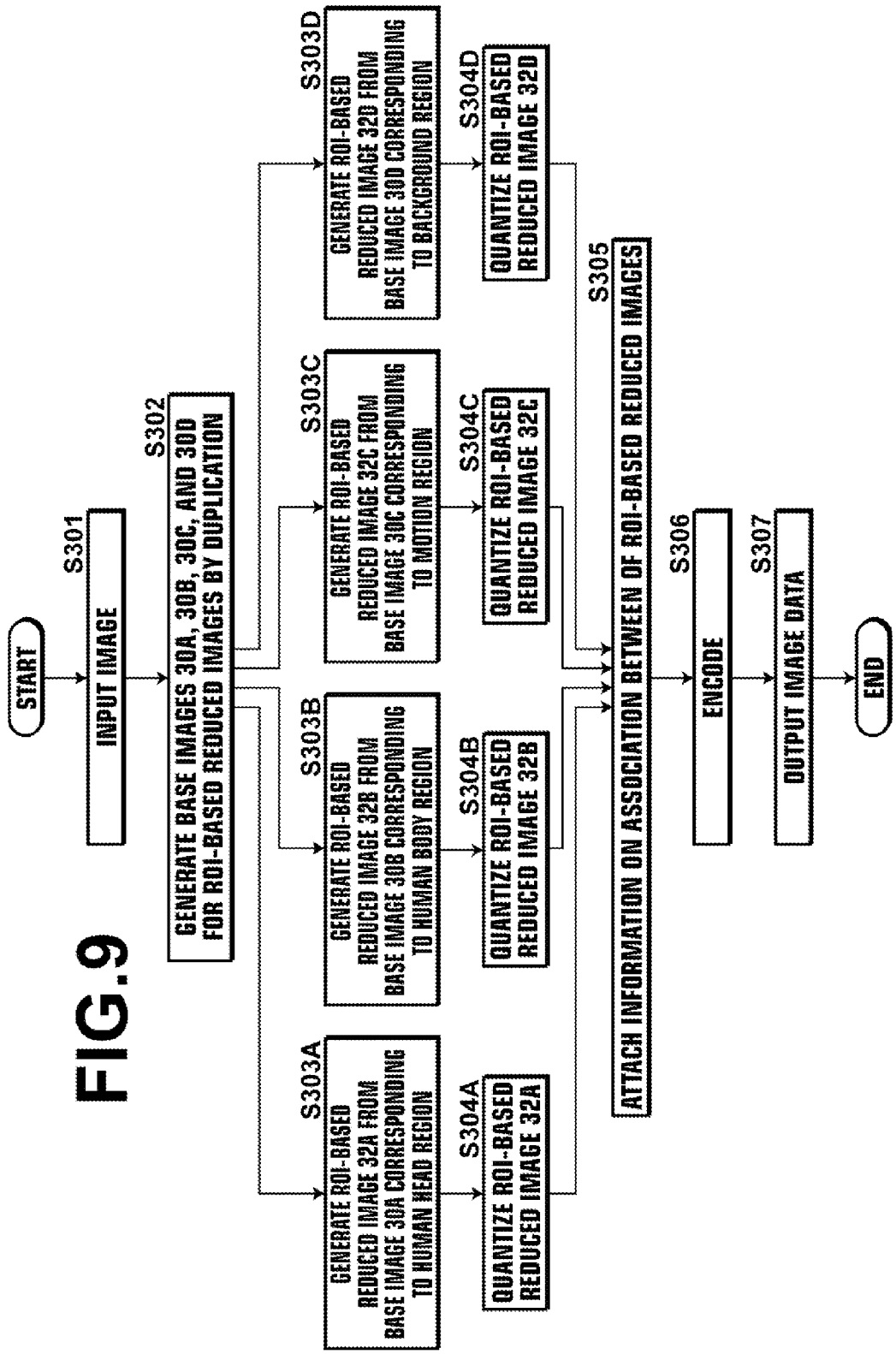

FIG.10

| IMAGE-SIZE CONDITION (RESOLUTION CONDITION) | REGION OF INTEREST 51A | REGION OF INTEREST 51B | REGION OF INTEREST 51C | REGION OF INTEREST 51D |
|---|---|---|---|---|
| INITIAL VALUE OF RESOLUTION (dpi) | $R_{A1}$ | $R_{B1}$ | $R_{C1}$ | $R_{D1}$ |
| TARGET DEGREE OF SHARPNESS | $S_{0A}$ | $S_{0B}$ | $S_{0C}$ | $S_{0D}$ |
| RESOLUTION | $R_{Ak}$ | $R_{Bk}$ | $R_{Ck}$ | $R_{Bk}$ |

| QUANTIZATION CONDITION FOR EACH REGION OF INTEREST | REGION OF INTEREST 51A | REGION OF INTEREST 51B | REGION OF INTEREST 51C | REGION OF INTEREST 51D |
|---|---|---|---|---|
| QUANTIZATION PARAMETER | $Q_{p_A}$ | $Q_{p_B}$ | $Q_{p_C}$ | $Q_{p_D}$ |
| TARGET IMAGE QUALITY | $N_0$ | | | |

~72

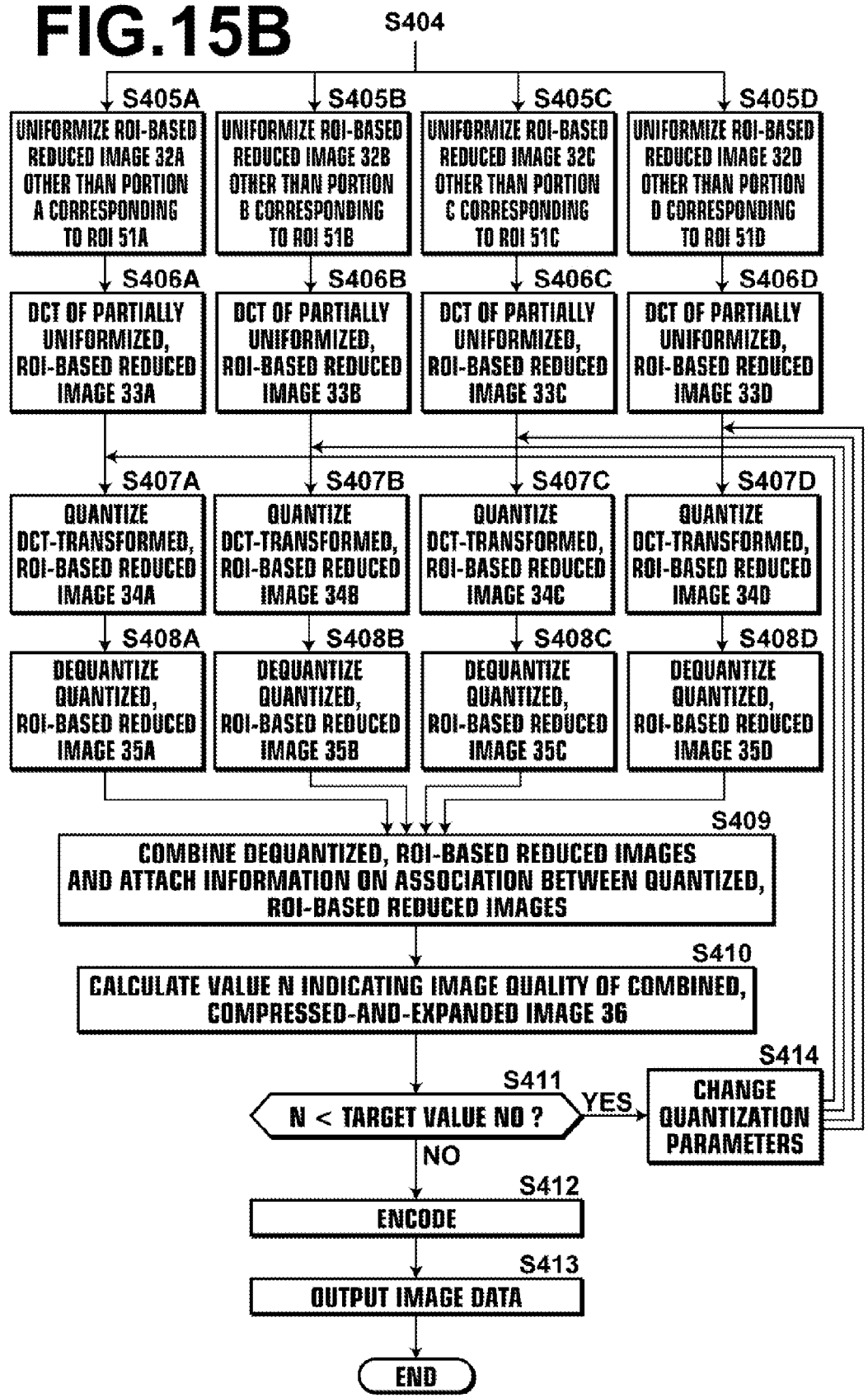

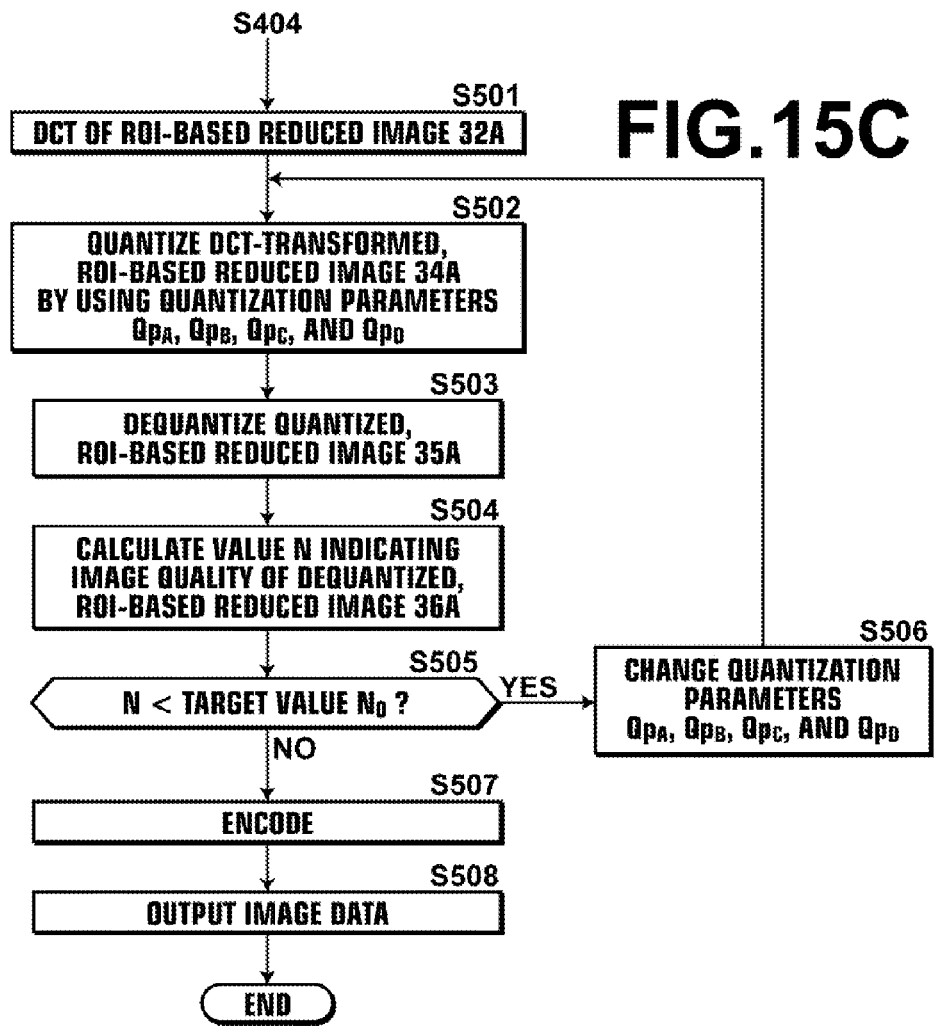

APPARATUS, PROCESS, AND PROGRAM FOR IMAGE ENCODING

BACKGROUND OF THE INVENTION

1. Field of the Invention

The present invention relates to an apparatus and a process for image encoding, and a computer-readable non-transitory medium storing an image encoding program for making a computer execute the process for image encoding.

2. Description of the Related Art

Currently, development of the digital recording technology (such as MPEG) for recording video images taken by crime prevention cameras and the like is proceeding. Although video recording can be realized by storing video data in recording media such as HDDs (hard disk drives), opto-magnetic disks, and the like, the volume occupied by the video data in the recording media varies with the compression ratio of the video data even when the recording time is unchanged. For example, in the crime prevention camera systems, the time for which video data is recorded is long, so that the amount of data to be stored becomes massive. Therefore, it is necessary to increase the compression ratio while maintaining the image quality.

U.S. Patent Application Publication No. 20090202169 discloses an image transmission system in which an image is divided into a region of interest and regions other than the region of interest. The images of the regions other than the region of interest is filtered through a low-pass filter so that the resolution of the images of the regions other than the region of interest is lowered. On the other hand, the image of the region of interest is not filtered through the low-pass filter. That is, the amount of data is reduced by lowering the resolution of the images of the regions other than the necessary region.

In addition, Japanese Unexamined Patent Publication No. 2004-193968 discloses a color image communication system in which reference image data is produced by decoding received image data, and comparison image data is produced by encoding the reference image data with a predetermined encoding parameter and decoding the encoded image data. Then, the reference image data and the comparison image data are compared in order to obtain an evaluation result. When the evaluation result is at a level higher than a certain level, the predetermined encoding parameter is changed so as to increase the compression ratio. When the evaluation result is at a level lower than the certain level, the predetermined encoding parameter is changed so as to decrease the compression ratio.

However, according to the technique disclosed in U.S. Pat. No. 7,801,337, the filtering with the low-pass filter is not applied to the region of interest. Therefore, there is a possibility that the amount of video data cannot be sufficiently reduced in the case where the resolution of the image of the region of interest is allowed to be further reduced.

In addition, according to the technique disclosed in Japanese Unexamined Patent Publication No. 2004-193968, the encoding parameter and the like are changed after the encoding of the image data is completed. Therefore, the operations for image compression including the encoding are performed on the inputted image data even in the case where the compression ratio of the inputted image data is allowed to be further increased, so that calculation burden of the image compression processing is high.

SUMMARY OF THE INVENTION

The present invention has been made in view of the above circumstances.

The first object of the present invention is to provide an apparatus and a process for image encoding which can effectively reduce the image data size and increase the compression ratio while reducing the calculation burden of the image compression processing and maintaining the image quality at least a necessary level.

The second object of the present invention is to provide a computer-readable non-transitory medium storing an image encoding program which makes a computer execute the above process for image encoding.

In order to accomplish the first object, according to the first aspect of the present invention, an image encoding apparatus for encoding data of an inputted image and outputting encoded image data is provided. The image encoding apparatus comprises: an image-size-condition storage which stores an image-size condition including image size and target sharpness; an image-size reduction unit which produces a reduced image of the inputted image having the image size included in the image-size condition stored in the image-size-condition storage; a sharpness calculation unit which calculates the sharpness of the reduced image; and an image-size control unit which reduces the image size included in the image-size condition stored in the image-size-condition storage and makes the image-size reduction unit further reduce the inputted image to the reduced image size, when the sharpness of the reduced image calculated by the sharpness calculation unit is higher than the target sharpness.

In addition, in order to accomplish the first object, according to the first aspect of the present invention, an image encoding process for encoding data of an inputted image and outputting encoded image data is also provided. In the image encoding process comprises: an image-size condition including the image size and the target sharpness is stored in an image-size-condition storage; a reduced image of the inputted image and having the image size included in the image-size condition stored in the image-size-condition storage is produced; and the sharpness of the reduced image is calculated. When the calculated sharpness of the reduced image is higher than the target sharpness, the image size included in the image-size condition stored in the image-size-condition storage is further reduced, and the inputted image is reduced to the reduced image size.

Further, in order to accomplish the second object, according to the third aspect of the present invention, a computer-readable non-transitory medium storing an image encoding program for encoding data of an inputted image and outputting encoded image data is provided. When a computer executes the image encoding program, the image encoding program realizes in the computer: an image-size-condition storage which stores an image-size condition including the image size and the target sharpness; an image-size reduction unit which produces a reduced image of the inputted image and having the image size included in the image-size condition stored in the image-size-condition storage; a sharpness calculation unit which calculates the sharpness of the reduced image; and an image-size control unit which reduces the image size included in the image-size condition stored in the image-size-condition storage and makes the image-size reduction unit further reduce the inputted image to the reduced image size, when the sharpness of the reduced image calculated by the sharpness calculation unit is higher than the target sharpness.

In the above provisions according to the present invention, the image size may be reduced in any manner, either directly or indirectly. For example, the image size can be reduced by reduction of the number of pixels, which reduces the resolution. Specifically, the image size can be reduced by simply thinning out the pixels, or replacing each of groups of multiple pixels located adjacent to each other with a pixel having an average of the values of the multiple pixels. Alternatively, the image size can be reduced by filtering through a low-path filter.

The sharpness is an index indicating the degree of sharpness perceived by the human visual sense. In the present invention, the sharpness can be defined in various manners in which the proportion of high frequency components in an image can be expressed either directly or indirectly, on the basis of the knowledge obtained by the present inventor and his colleagues explained below.

There is a correlation between the sharpness of an image and high frequency components in the image. That is, the sharpness of images is maintained when the images contain a great amount of high frequency components. On the other hand, the images containing a small amount of high frequency components are possibly a flat tone image in which sharpness is lost at portions of the images corresponding to edges of objects. Therefore, in the present invention, an index directly or indirectly representing the proportion of the high frequency components in the image is assumed to be used for indicating the sharpness. The sharpness of an image is determined to have sharpness above a reference level when the amount of the high frequency components in the image is equal to or greater than a reference amount, and the sharpness of an image is determined to have sharpness below the reference level when the amount of the high frequency components in the image is smaller than the reference amount.

For example, the sharpness used in the present invention may be a quantity directly or indirectly representing the total amount of the high frequency components having spatial frequencies equal to or higher than predetermined frequency in a spatial-frequency-decomposed image. Alternatively, the sharpness used in the present invention may be determined on the basis of the sum of the absolute values of the pixel values of a difference image obtained by comparison between a reference image having a reference degree of sharpness and a target image on which compression-related processing for image size reduction, compression/decompression, or the like is already performed and of which the sharpness is to be calculated, where the value of each pixel of the difference image is the deviation of the value of the corresponding pixel in the target image from the value of the corresponding pixel in the reference image. Since, generally, high frequency components are compressed by compression-related processing with higher compression ratios than low frequency components, high frequency components tend to be lost by compression-related processing more greatly than low frequency components. Therefore, the pixel values of the high frequency components which are lost by the compression-related processing are reflected in the difference image between the reference image and the target image, and the sharpness can be determined on the basis of the sum of the absolute values of the pixel values of the difference image. Specifically, the amount of reduction of the high frequency components in the target image increases with the sum of the absolute values of the pixel values of the difference image.

The image encoding apparatus, the image encoding process, and the computer-readable non-transitory medium storing the image encoding program according to the present invention can reduce the image size while maintaining the sharpness equal to or higher than the target sharpness, and can then compress the image so that the compressed image has the reduced image size. Therefore, it is possible to reduce the calculation burden of the processing for image compression which is to be thereafter performed, and achieve high compression of the image while maintaining the sharpness equal to or higher than the target sharpness without unnecessarily increasing the calculation burden.

Preferably, the image encoding apparatus according to the first aspect of the present invention may further have one or any possible combination of the following additional features (i) to (xv).

(i) Until the sharpness of the further reduced image reaches the target sharpness, the image-size control unit repeats the operation of reducing the image size included in the image-size condition stored in the image-size-condition storage and the operation of making the image-size reduction unit reduce the inputted image to the reduced image size.

In this case, before processing for image compression is performed, the image size is reduced to the minimum within the range in which the target sharpness is satisfied. Therefore, it is possible to reduce the calculation burden of the processing for image compression which is to be thereafter performed, and achieve high compression of the image while maintaining the sharpness equal to or higher than the target sharpness without unnecessarily increasing the calculation burden.

(ii) The image encoding apparatus according to the first aspect of the present invention may further comprise a region-of-interest detection unit which detects from the inputted image or the reduced image a plurality of regions of interest respectively receiving different degrees of interest, and a region-of-interest separation unit which separates region-of-interest images respectively representing the plurality of regions of interest from the inputted image or the reduced image. In this case, the image-size-condition storage separately stores target degrees of sharpness respectively for the region-of-interest images; and the image-size control unit determines image-size conditions respectively for the plurality of regions of interest, and obtains a plurality of ROI-based reduced images respectively in correspondence with the plurality of regions of interest, where each of the plurality of ROT-based reduced images represents the inputted image and has sharpness equal to one of the target degrees of sharpness corresponding to the ROT-based reduced image.

In the above case, it is possible to prevent excessive reduction in the image size of the ROI-based reduced image corresponding to each region of interest of which the image size is not to be reduced, and greatly reduce the image size of the ROI-based reduced image corresponding to each region of interest of which the image size is allowed to be reduced. Therefore, before the subsequent processing for compression, the sharpness of each region of interest is maintained equal to or higher than a target degree of sharpness corresponding to the degree of interest in the region of interest, and the image size of the ROI-based reduced image corresponding to each region of interest is effectively reduced to the amount corresponding to the degree of interest. Thus, it is possible to effectively reduce the calculation burden, and achieve high compression of the image while maintaining the sharpness equal to or higher than the target sharpness without unnecessarily increasing the calculation burden.

(iii) In the image encoding apparatus having the above feature (i), the image-size-condition storage further stores predetermined candidate values of an index indicating the image size.

(iv) In the image encoding apparatus having the above feature (ii), the plurality of regions of interest include at least one of a region of a human head, a region of a human body, a motion region, and a background region.

(v) In the image encoding apparatus having the above feature (iv), the plurality of regions of interest include at least two of the region of the human head, the region of a human body, the motion region, and the background region, and the different degrees of interest are set so as to decrease in the order of the region of the human head, the region of a human body, the motion region, and the background region.

(vi) In the image encoding apparatus having the above feature (ii), the inputted image constitutes a video image; and the image encoding apparatus further comprises an interframe-compression-condition storage which stores an interframe-compression condition as a condition for compressing a portion of the video image corresponding to each of the plurality of regions of interest along a time direction, and an interframe compression unit which compresses the video image along the time direction in accordance with the interframe-compression condition.

(vii) In the image encoding apparatus having the above feature (vi), the interframe-compression condition for each of the plurality of regions of interest indicates a compression ratio of the video image along the time direction; and the interframe-compression conditions are set so that the compression ratios for the plurality of regions of interest decrease in ascending order of the different degrees of interest.

In the image encoding apparatus having the above features (vi) and (vii), the frame rate in each region of interest can be effectively decreased according to the degree of interest in the region of interest while the sharpness of each region of interest is maintained equal to or higher than target sharpness corresponding to the degree of interest in the region of interest. Therefore, it is possible to prevent excessive decrease in the frame rate in each region of interest in which the frame rate is not to be decreased, and greatly decrease the frame rate in each region of interest in which the frame rate is allowed to be decreased. Thus, it is possible to further reduce the calculation burden, and achieve higher compression of the image.

(viii) In the image encoding apparatus having the above feature (vii), the interframe-compression condition includes a skip macroblock, and the interframe compression unit lowers the frame rate by changing a macroblock type into the skip macroblock.

The "skip macroblock" is a macroblock type, which is set for each macroblock contained in each frame in some types of video compression systems such as the MPEG (Moving Picture Expert Group) systems. In such types of video compression systems, each frame is divided into macroblocks each having the size of 16×16 pixels, 16×8 pixels, or the like, and quantization is performed on a macroblock-by-macroblock basis. In the case where the skip macroblock is set as the macroblock type of a macroblock in a frame, the data in the macroblock in the frame is skipped, and instead the data in the corresponding macroblock in the preceding (or following) frame is referred to. When the skip macroblock is also set for the macroblock in the preceding (or following) frame which is referred to, the data in the corresponding macroblock in the further preceding (or further following) frame is referred to.

In addition, the expression "lowers a frame rate" means not only the lowering of the frequency (the number per unit time) of updates of the screen on a frame-by-frame basis, and also omission of interframe encoding of a macroblock on the basis of the setting of the skip macroblock.

(ix) In the image encoding apparatus having the above feature (viii), the interframe-compression condition is set so that a rate at which the macroblock type is changed into the skip macroblock in each of the plurality of regions of interest is relatively low when one of the different degrees of interest in the region of interest is relatively high.

The rate at which the macroblock type is changed into the skip macroblock may be the rate at which the macroblock type is set to the skip macroblock in the plurality of macroblocks contained in each frame, or the rate at which the macroblock type is set to the skip macroblock in one or more corresponding macroblocks contained in more than one frame. An example of the rate in the latter case is the rate at which the macroblock type is set to the skip macroblock in specific macroblocks, containing images of an identical object, in successive frames.

(x) The image encoding apparatus having the above feature (ii) may further comprise a quantization control unit which differentiates the manners of quantization of the plurality of ROI-based reduced images respectively according to the image sizes of the plurality of ROI-based reduced images. In this case, it is possible to use the different manners of quantization realizing different compression ratios according to the image sizes of the ROI-based reduced images, so that satisfactory image quality can be maintained even after compression.

(xi) In the image encoding apparatus having the above feature (x), the quantization control unit determines, according to the image sizes of the plurality of ROI-based reduced images, whether to quantize only one of the plurality of ROI-based reduced images by using a first set of different quantization conditions respectively corresponding to the plurality of regions of interest and determining compression ratios in quantization, or to quantize the plurality of ROI-based reduced images by using a second set of different quantization conditions respectively corresponding to the plurality of regions of interest and determining compression ratios in quantization. In this case, quantization manners realizing different compression ratios can be applied to the respective portions, corresponding to the plurality of regions of interest, of one or each of the ROI-based reduced images, so that it is possible to maintain satisfactory image quality even after compression.

(xii) The image encoding apparatus having the above feature (xi) may further comprise a quantization-condition storage which stores the first set of different quantization conditions and the second set of different quantization conditions, and a quantization unit which quantizes the plurality of ROI-based reduced on the basis of the first set of different quantization conditions or the second set of different quantization conditions; and the quantization control unit compares the image sizes of the plurality of ROI-based reduced images, makes the quantization unit quantize only one of the plurality of ROI-based reduced images under the first set of different quantization conditions in the case where all of the image sizes of the plurality of ROI-based reduced images are identical, and makes the quantization unit quantize the plurality of ROI-based reduced images under the second set of different quantization conditions in the case where the image sizes of the plurality of ROI-based reduced images are not all identical.

In this case, quantization manners realizing different compression ratios can be applied to the respective portions, corresponding to the plurality of regions of interest, of one or each of the ROI-based reduced images, so that it is possible to maintain satisfactory image quality even after compression.

(xiii) The image encoding apparatus having the above feature (xii) may further comprise a dequantization unit which dequantizes the plurality of ROI-based reduced images quantized by the quantization unit, and an image-quality calculation unit which calculates the image quality of each of the plurality of ROI-based reduced images obtained by dequantization by the dequantization unit; the quantization conditions include a predetermined target image quality level and a quantization parameter which is set for each of the plurality of regions of interest; and the quantization control unit makes the quantization unit repeat the operation of changing the quantization parameter and making the quantization unit quantize each of the plurality of ROI-based reduced images on the basis of the changed quantization parameter until the image quality of the ROI-based reduced image calculated by the image-quality calculation unit reaches the predetermined target image quality level.

In the case where the image encoding apparatus according to the first aspect of the present invention has the above feature (xiii), quantization can be performed by using a quantization parameter realizing a high compression ratio within the range in which the target image quality is satisfied, so that it is possible to achieve high compression of the image while maintaining the image quality even after compression.

The target image quality may be a threshold which is defined by any index indicating the image quality. For example, the index may be defined by the sharpness, a signal-to-noise ratio, a block noise amount, the linear sum of the block noise amount and an edge amount, or a combination of these indexes expressed by an appropriately provided formula.

The block noise is an artifact which has a mosaic-like appearance in a reproduced image, and the mosaic-like appearance is produced because loss of continuity at the boundaries between macroblocks caused by high compression of an original image makes the boundaries apparent in the reproduced image. The block noise amount is a numerical value which quantitatively indicates the block noise, and can be defined in various manners of directly or indirectly indicating the amount of block noise in the screen. In addition, the block noise amount can be defined for each image (frame) or for each macroblock. For example, the block noise amount can be defined by discontinuity between adjacent macroblocks, and can be specifically defined as an average value of interpixel differences across the boundaries between macroblocks which is obtained after acquiring interpixel differences in both of the horizontal and vertical directions.

Alternatively, the block noise amount can be defined by the flatness of macroblocks and the discontinuity between adjacent macroblocks. For example, in the case where the block noise amount is obtained for each macroblock, the variance and the average of the pixel values in each macroblock constituting a frame are calculated. Then, it is determined whether or not the variance of the pixel values in each macroblock is equal to or smaller than a threshold, and one or more macroblocks in which the variance of the pixel values is equal to or smaller than the threshold, i.e., one or more macroblocks which possibly have a flat distribution of pixel values, are extracted. Thereafter, the block noise amount is evaluated for each of the one or more extracted macroblocks (possibly having a flat distribution of pixel values), and one or more of the macroblocks which are located adjacent, in the horizontal or vertical directions, to each of the one or more extracted macroblocks to be evaluated and in which the variance of the pixel values is equal to or smaller than the threshold (i.e., the distribution of pixel values is flat) are extracted. Then, the block noise amount N is determined to be the sum of the absolute values of the differences between the average of the pixel values in the macroblock to be evaluated and the averages of the pixel values in the one or more adjacent macroblocks extracted as above. Since each of the macroblock to be evaluated and the one or more adjacent macroblocks extracted as above possibly has a flat distribution of pixel values, block noise can appear between the macroblock to be evaluated and each of the one or more adjacent macroblocks extracted as above, and the difference between the average of the pixel values in the macroblock to be evaluated and the averages of the pixel values in the one or more adjacent macroblocks extracted as above can be considered to represent the degree of block noise between the macroblock to be evaluated and the one or more adjacent macroblocks extracted as above.

The edge amount is a numerical value representing the amount of edges existing in a frame, and can be defined in various manners of indicating the amount of edges existing in a frame. For example, an image indicating only edges extracted from a frame by any of various edge detection methods including the Sobel method, the Laplacian method, the Canny method, and the like is generated, and the edge amount can be defined as the sum of the pixel values in the image indicating only the extracted edges. In addition, the edge amount can be defined either for each frame or for each macroblock.

The target image quality may be defined either for each frame or for each macroblock. The linear sum of the block noise amount and the edge amount may be a weighted sum of the block noise amount and the edge amount.

(xiv) In the image encoding apparatus having the above feature (xiii), the predetermined target image quality level is preferably represented by a threshold of a linear sum of the block noise amount and the edge amount. In this case, quantization can be performed by using a quantization parameter realizing a high compression ratio within a predetermined range of the linear sum of the block noise amount and the edge amount, so that it is possible to achieve high compression of the image while maintaining the image quality even after compression within a predetermined range.

(xv) In the image encoding apparatus having the above feature (xiii), the image-size condition stored in the image-size-condition storage further includes the image quality of the inputted image as target image quality; and the image encoding apparatus further comprises an additional image-size control unit which reduces the image size included in the image-size condition stored in the image-size-condition storage and makes the image-size reduction unit produce a reduced image of the inputted image so that the reduced image has the image size reduced by the additional image-size control unit and the image quality of the reduced image is equal to or higher than the above target image quality, before the aforementioned image-size control unit reduces the image size in the image-size condition and makes the image-size reduction unit produce the reduced image of the inputted image as mentioned before.

The additional target image quality may also be defined by any index indicating the image quality. For example, the index may be defined by the sharpness, a signal-to-noise ratio, the block noise amount, a linear sum of the block noise amount and the edge amount, or a combination of these indexes expressed by an appropriately provided formula.

In the image encoding apparatus according to the present invention having the feature (xv), the image size is changed on the basis of the target image quality, and is actually reduced, before performing processing for compression, so as to maintain the image quality equal to or higher than the target image quality. Therefore, it is possible to achieve high compression of the image while satisfying the target image quality without unnecessarily increasing the calculation burden.

BRIEF DESCRIPTION OF THE DRAWINGS

FIG. 9 is a flow diagram illustrating a sequence of processing performed in the image encoding apparatus according to the second embodiment.

FIG. 10 is a diagram illustrating examples of image-size conditions according to the second embodiment.

FIG. 14 is a diagram illustrating examples of quantization conditions according to the fourth embodiment.

FIGS. 15A, 15B, and 15C are flow diagrams illustrating a sequence of processing performed in an image encoding apparatus according to the fourth embodiment.

FIG. 16 is a diagram illustrating examples of quantization conditions according to a variation of the fourth embodiment.

DESCRIPTION OF PREFERRED EMBODIMENTS

Figure 1:
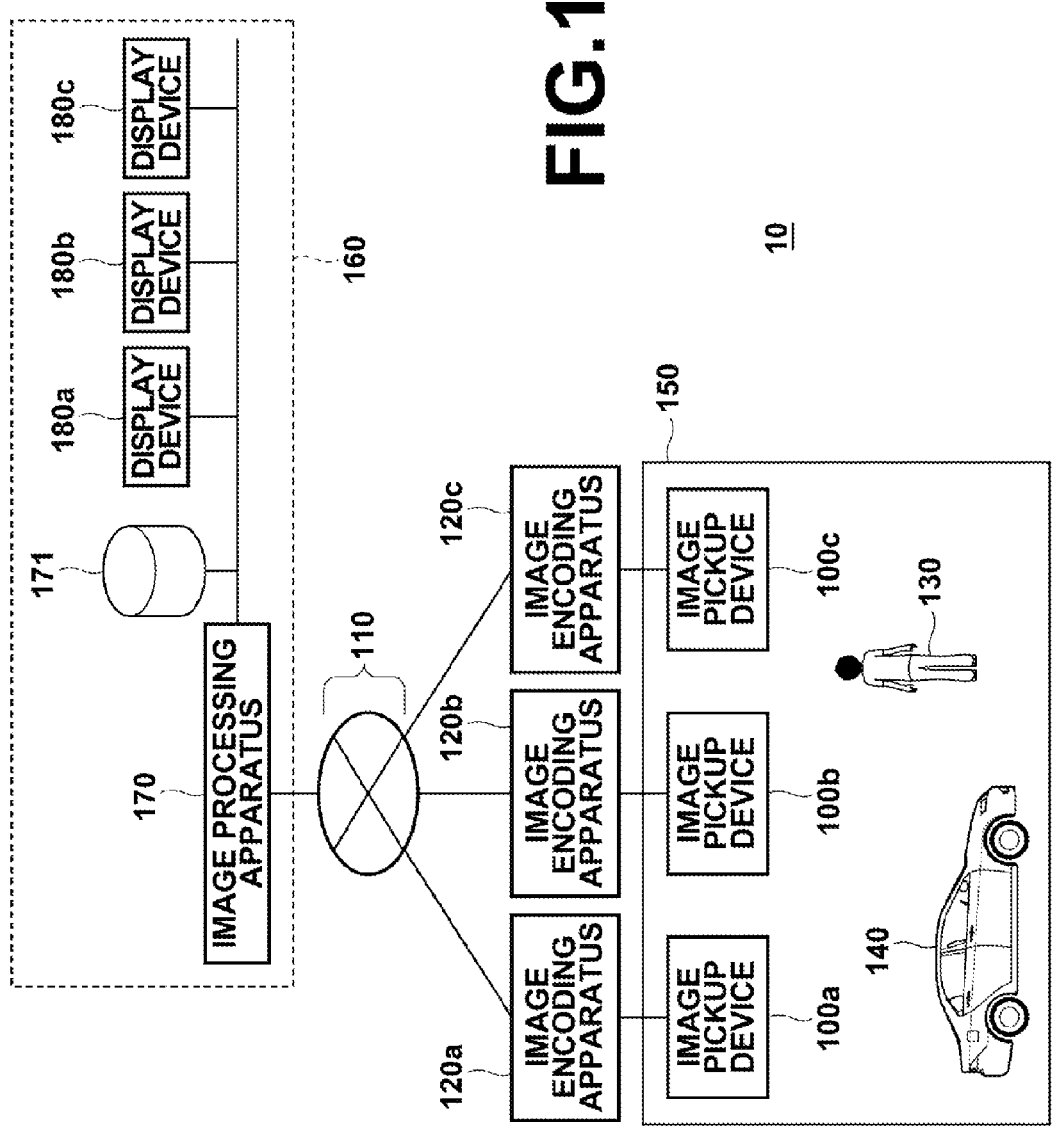
FIG. 1 is a diagram schematically illustrating a configuration of an image processing system 10 according to the first embodiment of the present invention.

Preferred embodiments of the present invention are explained in detail below with reference to drawings, wherein like reference numbers refer to like elements throughout.
1. First Embodiment
1.1 System Configuration FIG. 1 is a diagram schematically illustrating an outline of a configuration of the image processing system 10 according to the first embodiment of the present invention. The image processing system 10 reduces the amount of data representing an image while maintaining the quality of the image of the object.

As illustrated in FIG. 1, the image processing system 10 comprises a plurality of image pickup devices 100a, 100b, and 100c (which may be hereinafter collectively referred to as the image pickup devices 100), a plurality of image encoding apparatuses 120a, 120b, and 120c (which may be hereinafter collectively referred to as the image encoding apparatuses 120), an image processing apparatus 170, a communication network 110, an image database (DB) 171, and a plurality of display devices 180a, 180b, and 180c (which may be hereinafter collectively referred to as the display devices 180). The image pickup devices 100 each pick up a video image of a space 150 to be monitored. The image encoding apparatuses 120 process the video image. In the example of FIG. 1, a human object 130 and a car 140 exist in the space 150 to be monitored.

The image encoding apparatus 120a is connected to the image pickup device 100a, the image encoding apparatus 120b is connected to the image pickup device 100b, and the image encoding apparatus 120c is connected to the image pickup device 100c. The image processing apparatus 170 and the display devices 180 are placed in a space 160, which is different from the space 150 to be monitored.

Hereinbelow, the operations of the image pickup device 100a, the image encoding apparatus 120a, the image processing apparatus 170, and the display device 180a are explained. The image pickup device 100a picks up the video image of the space 150, and generates data of the picked-up video image (i.e., picked-up video data), and outputs the picked-up video data to the image encoding apparatus 120a. Specifically, the image pickup device 100a picks up the video image, and generates a plurality of constituent frames constituting the picked-up video image. At this time, the plurality of constituent frames generated by the image pickup device 100a may be RAW format data.

Then, the image encoding apparatus 120a acquires the picked-up video data generated by the image pickup device 100a. The image encoding apparatus 120a generates encoded picked-up video data by synchronizing the constituent frames in a RAW format generated by the image pickup device 100a, and compressing the picked-up video image containing the synchronized constituent frames by a video image compression technique such as MPEG.

Figure 18:
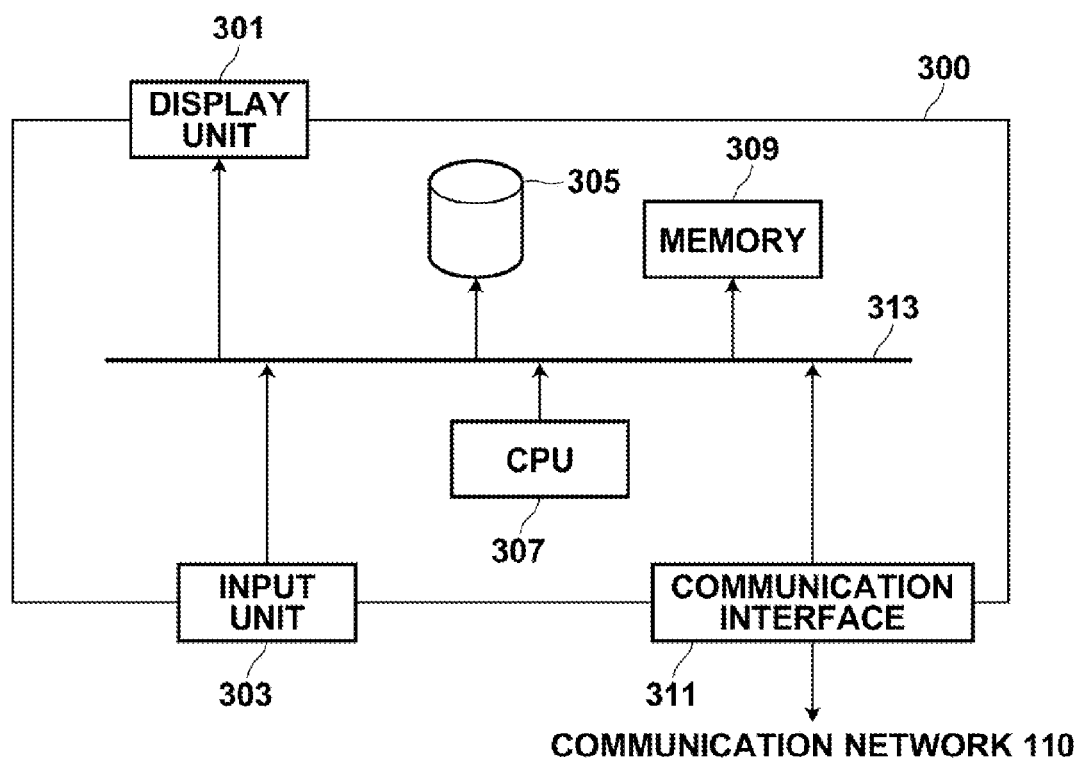
FIG. 18 is a diagram illustrating a hardware construction which can be used in all of the image encoding apparatuses according to the first to fourth embodiments and the variations of the first and fourth embodiments.

FIG. 18 is a diagram illustrating an outline of a hardware construction which can be used in each of the image encoding apparatuses 120 according to the first embodiment (and the other embodiments, which are explained later). As illustrated in FIG. 18, each image encoding apparatus 120 according to the present embodiment is realized by an image-processing workstation 300 which comprises a display device 301, an input unit 303, a hard disk drive 305, a CPU (central processing unit) 307, a memory 309, and a communication interface 311. The display device 301 displays various information, and is, for example, a liquid crystal display device. The input unit 303 is provided for inputting various information, and is realized by, for example, a keyboard and a mouse. The hard disk drive 305 stores various programs for controlling the image encoding apparatus according to the present embodiment and various data including image data. The CPU 307 controls the image encoding apparatus according to the present embodiment by executing various programs. The memory 309 provides a work area for use in execution of the programs. The communication interface 311 is connected to the communication network 110 through a bus 313.

In all the embodiments of the present invention, the functions according to the present invention can be realized by one or more computers which execute one or more programs externally installed into the computers. For example, the above programs may be installed by supplying one or more sets of information items including the programs to the computers from en external storage medium through a network, or from a storage medium such as a CD-ROM (compact disk read only memory), a flash memory, or a floppy disk (FD).

Referring back to FIG. 1, as mentioned before, the image encoding apparatus 120a generates the encoded video data by encoding the plurality of constituent frames constituting the picked-up video image, and transmits the encoded video data to the image processing apparatus 170 through the communication network 110.

The image processing apparatus 170 receives the encoded video data from the image encoding apparatus 120a, and acquires the video image by decoding the encoded video data received from the image encoding apparatus 120a. In the case where each of the image encoding apparatuses in the second, third, and fourth embodiments separates each constituent frame constituting the video image into images corresponding to regions of interest detected on the basis of the respectively corresponding feature quantities, and generates region-of-interest videos from the separated images, the image processing apparatus 170 receives the region-of-interest videos from the image encoding apparatus and decodes each of the region-of-interest videos, where the region-of-interest videos are associated with each other. Then, the image processing apparatus 170 generates a combined video image by combining the acquired region-of-interest videos, and supplies the combined video image to the display device 180a. The display device 180a displays the combined video image supplied by the image processing apparatus 170.

The image processing apparatus 170 may record in the image DB 171 the combined video image generated by the image processing apparatus 170 or the encoded video data acquired from the image encoding apparatus 120a. Further, in response to a request from the display device 180a, the image processing apparatus 170 may supply to the display device 180a the combined video image recorded in the image DB 171. Furthermore, also in response to a request from the display device 180a, the image processing apparatus 170 may decode the encoded video data recorded in the image DB 171 so as to acquire the picked-up video image, and supply the picked-up video image to the display device 180a. For example, the image DB 171 may have a nonvolatile storage medium such as a hard disk drive, and record in the storage medium the combined video image supplied from the image processing apparatus 170.

Each of the image pickup devices 100b and 100c has functions similar to the functions of the image pickup device 100a. Since the functions and the operations of the image pickup devices 100b and 100c are similar to the functions and the operations of the image pickup device 100a except that the image pickup devices 100b and 100c respectively supply picked-up video data to the image encoding apparatuses 120b and 120c, explanations on the functions and the operations of the image pickup devices 100b and 100c are not indicated in this specification. In addition, each of the image encoding apparatuses 120b and 120c has functions similar to the functions of the image encoding apparatus 120a. Since the functions and the operations of the image encoding apparatuses 120b and 120c are similar to the functions and the operations of the image encoding apparatus 120a except that the image encoding apparatuses 120b and 120c respectively receive the picked-up video data from the image pickup devices 100b and 100c, explanations on the functions and the operations of the image encoding apparatuses 120b and 120c are not indicated in this specification. Further, in the second, third, and fourth embodiments, the image processing apparatus 170 receives region-of-interest videos from the image encoding apparatuses 120b and 120c similarly to the reception of the region-of-interest videos from the image encoding apparatus 120a, generates a combined video image on the basis of the encoded video data or the region-of-interest videos, and supplies the generated video image to the corresponding one of the display devices 180b and 180c. As the display device 180a, each of the display devices 180b and 180c displays the video image supplied from the image processing apparatus 170.

In the some cases where the image processing system 10 is used as a monitoring system, portions of a video image corresponding to characteristic objects to be monitored such as human objects, moving objects, and the like can be maintained with high image quality. Further, in some cases, the amount of data of a video image can be reduced.

1.2 Functions of Image Encoding Apparatus

Figure 2:
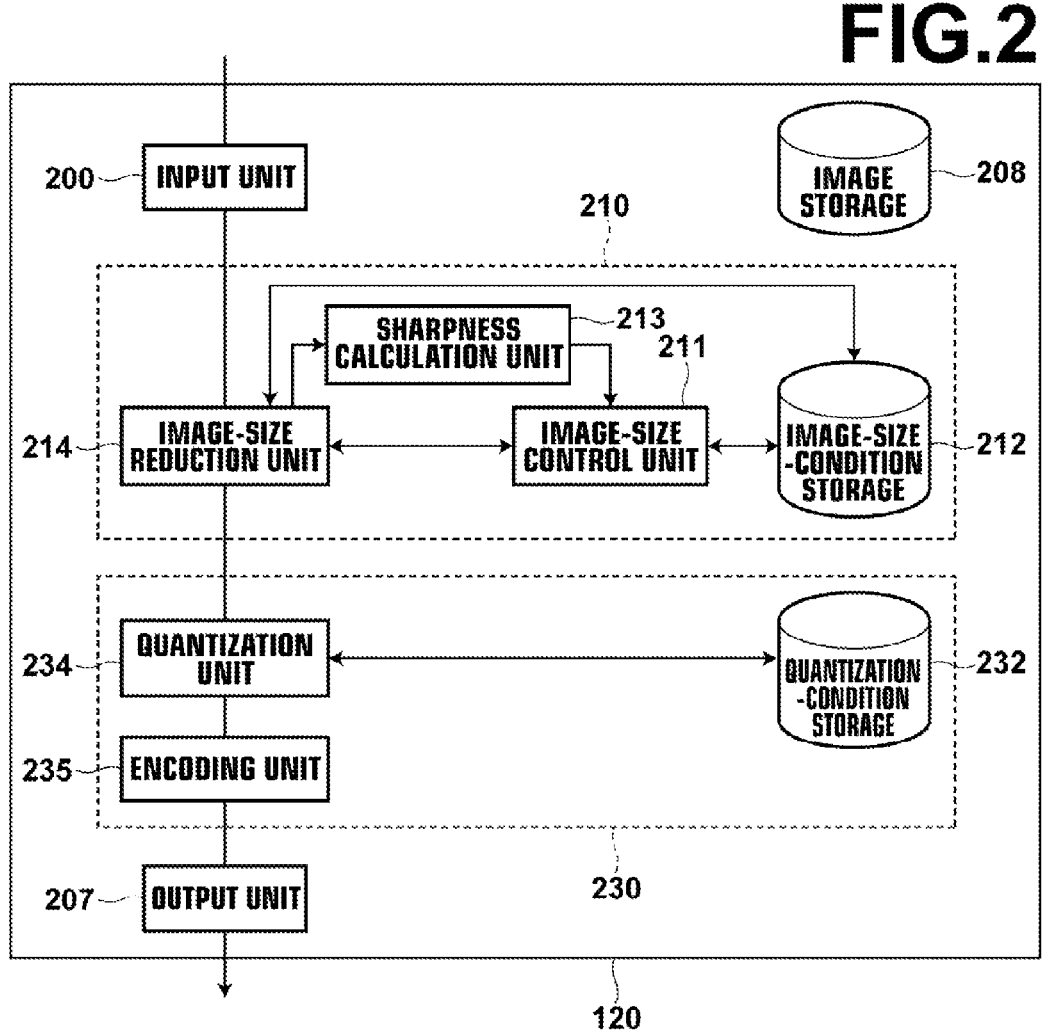
FIG. 2 is a block diagram illustrating functions of an image encoding apparatus 120 according to the first embodiment.

FIG. 2 is a block diagram illustrating functions of an image encoding apparatus 120 according to the first embodiment, which can be used as one of the image encoding apparatuses 120a, 120b, and 120c in the configuration of the image processing system 10 illustrated in FIG. 1. As illustrated in FIG. 2, the image encoding apparatus 120 encodes an inputted image 30, and outputs the encoded image. The image encoding apparatus 120 comprises an input unit 200, an output unit 207, an image storage 208, an image-size control unit 211, an image-size-condition storage 212, a sharpness calculation unit 213, an image-size reduction unit 214, a quantization-condition storage 232, a quantization unit 234, and an encoding unit 235. The image-size-condition storage 212 stores an image-size condition including image size $R_k$ (where k is a natural number) and target sharpness $S_O$, where the image size and the target sharpness $S_O$ are initially preset. The inputted image 30 is inputted into the image encoding apparatuses 120 through the input unit 200. The image-size reduction unit 214 produces a reduced image 31 of the inputted image 30 having the image size $R_k$ by reducing the image size of the inputted image 30 to the predetermined image size $R_k$. The sharpness calculation unit 213 calculates the sharpness S of the reduced image 31. When the calculated sharpness S of the reduced image 31 is higher than the target sharpness $S_O$, the image-size control unit 211 reduces the predetermined image size $R_k$ included in the image-size condition stored in the image-size-condition storage 212 to the image size Rk+1 and makes the image-size reduction unit 214 reduce the inputted image 30 to the reduced image size Rk+1. The quantization unit 234 performs quantization of an image having the reduced image size. The quantization-condition storage 232 stores a quantization condition. The encoding unit 235 encodes a quantized image.

In FIG. 2, the image-size control unit 211, the image-size-condition storage 212, the sharpness calculation unit 213, and the image-size reduction unit 214 cooperate for reducing the image size, and constitute an image-size reduction processing unit 210. In addition, the quantization-condition storage 232, the quantization unit 234, and the encoding unit 235 cooperate for performing quantization, and constitute a quantization processing unit 230.

The image-size-condition storage 212 is realized mainly by the hard disk drive 305, and stores the image size $R_k$ and the target sharpness $S_O$ for reducing an inputted image 30. In this specification, the resolution is used as an index representing the image size. However, generally, the index representing the image size is not limited to the resolution, and any index which can directly or indirectly determine the image size may be used.

In the first embodiment, the image-size condition includes a value of the resolution $R_k$, which is selected from among a set of candidate values $R_1, R_2, \ldots, R_k, R_{k+1}, \ldots, R_n$ of the resolution. That is, in the first embodiment, the image size $R_k$ means the image size corresponding to the value $R_k$ of the resolution. The candidate values $R_1, R_2, \ldots, R_k, R_{k+1}, \ldots, R_n$ decrease in this order. For example, each of the values $R_1, R_2, \ldots, R_k, R_{k+1}, \ldots, R_n$ is smaller than the preceding one of the values $R_1, R_2, \ldots, R_k, R_{k+1}, \ldots, R_n$ by a predetermined ratio.

The image-size reduction unit 214 is realized mainly by the CPU 307, and includes n low-pass filters $F_1, F_2, \ldots, F_k, F_{k+1}, \ldots, F_n$ which realize reduction to images having the values of the resolution $R_1, R_2, \ldots, R_k, R_{k+1}, \ldots, R_n$, respectively. In order to reduce the image size of the inputted image 30 to the image size corresponding to the value of the resolution $R_k$, the image-size reduction unit 214 reduces the image size (resolution) of the inputted image 30 to the image size corresponding to the value of the resolution $R_k$ by filtering the inputted image 30 through the low-pass filter $F_k$ corresponding to the value of the resolution $R_k$. The inputted image 30 in the first embodiment is assumed to have a fixed value of resolution at all times. Therefore, the low-pass filters $F_1, F_2, \ldots, F_k, F_{k+1}, \ldots, F_n$ respectively capable of reducing the resolution of the inputted image 30 to the values of the resolution $R_1, R_2, \ldots, R_k, R_{k+1}, \ldots, R_n$, are determined in advance, for example, by reference to experimental examples, and information on the determined low-pass filters are stored in a database in correspondence with the values of the resolution $R_1, R_2, \ldots, R_k, R_{k+1}, \ldots, R_n$. One $F_k$ of the low-pass filters $F_1, F_2, \ldots, F_k, F_{k+1}, \ldots, F_n$ which can reduce the resolution of the inputted image 30 to one $R_k$ of the values of the resolution $R_1, R_2, \ldots, R_k, R_{k+1}, \ldots, R_n$ is set in the image-size condition by reference to the above database. In all the embodiments explained in this specification, the reduction of the image size is performed on the basis of reduction of the resolution by use of a low-pass filter.

However, the manner of reducing the image size is not limited to the above manner using the low-pass filters. Various techniques which can directly or indirectly reduce the image size can be used for reducing the image size. For example, the resolution can be reduced by simply thinning out pixels. Alternatively, the resolution can be reduced by choosing multiple pixels, performing statistical processing of the multiple pixels such as averaging of the values of the multiple pixels, and replacing the values of the multiple pixels with a value obtained by the statistical processing.

The sharpness calculation unit 213 is realized mainly by the CPU 307, and calculates the sharpness of the reduced image 31 which is acquired from the image-size reduction unit 214.

As explained in the "SUMMARY OF THE INVENTION", in the first embodiment, the sharpness is defined as the sum of the absolute values of the pixel values of a difference image obtained by comparison between a reference image having a reference degree of sharpness and a target image on which compression-related processing for image size reduction, compression/decompression, or the like is already performed and of which the sharpness is to be calculated, where the value of each pixel of the difference image is the deviation of the value of the corresponding pixel in the target image from the value of the corresponding pixel in the reference image.

In addition, as explained in the "SUMMARY OF THE INVENTION", in the first embodiment, generally, high frequency components are compressed by compression-related processing with higher compression ratios than low frequency components, so that high frequency components tend to be lost by compression-related processing more greatly than low frequency components. Therefore, the pixel values of the high frequency components which are lost by the compression-related processing are reflected in the difference image between the reference image and the target image. Specifically, the sum of the absolute values of the pixel values of the difference image corresponds to the amount of reduction of the high frequency components in the target image.

Alternatively, the sharpness may be defined in various manners as long as the proportion of high frequency components in the target image can be directly or indirectly represented. For example, it is possible to perform a spatial frequency transformation such as a DCT (discrete cosine transformation) of the target image, and define as the sharpness the proportion of high frequency components having frequencies equal to or higher than a predetermined frequency in all the frequency components. In this case, when the above proportion is small, it is possible to consider that the possibility of loss of the high frequency components is high, and therefore the sharpness is low.

When the sharpness S of the reduced image 31 calculated by the sharpness calculation unit 213 is higher than the target sharpness $S_O$, the image-size control unit 211 reduces the image size $R_k$ stored in the image-size-condition storage 212 to the image size Rk+1, and makes the image-size reduction unit 214 reduce the image size of the inputted image 30 to the reduced image size Rk+1. When the sharpness S of the reduced image 31 calculated by the sharpness calculation unit 213 is equal to or lower than the target sharpness $S_O$, the image-size control unit 211 outputs to the quantization unit 234 the most reduced image of the inputted image 30 within the range in which the target sharpness $S_O$ is satisfied.

In this example, as indicated in "SUMMARY OF THE INVENTION" as the additional feature (i), the image-size control unit 211 repeats the operation of reducing the image size included in the image-size condition stored in the image-size-condition storage 212 and the operation of making the image-size reduction unit produce a reduced image of the inputted image having the reduced image size, until the sharpness of the reduced image reaches the target sharpness. In this case, the image-size control unit 211 makes the image-size reduction unit 214 reduce the inputted image 30 to the image size corresponding to the resolution $R_k$ in the k-th repetition, and makes the image-size reduction unit 214 reduce the inputted image 30 to the image size corresponding to the resolution Rk+1 (i.e., the next highest resolution) in the (k+1)-th repetition.

The quantization unit 234 acquires the reduced image from the image-size control unit 211, and quantizes the reduced image. Specifically, the quantization unit 234 first transforms each region of a difference image into the spatial frequency domain by discrete cosine transformation (DCT). Alternatively, the transformation into the spatial frequency domain may be realized by other types of frequency transformation such as Hadamard transformation or wavelet transformation. Thereafter, the quantization unit 234 quantizes the transform coefficients obtained by the spatial frequency transformation into the spatial frequency domain.

The quantization-condition storage 232 is realized mainly by a storage device such as the HDD 305, and stores the quantization condition. The quantization condition is a condition for determining the compression ratio in the quantization, and includes, for example, quantization parameters and the like.

The encoding unit 235 is realized mainly by the CPU 307, and compresses the transform coefficients quantized by the quantization unit 234, by encoding, which is, for example, entropy encoding such as Huffman coding or arithmetic coding.

The input unit 200 is realized mainly by the CPU 307, and acquires a video image which is generated by the corresponding one of the image pickup devices 100 and inputted into the image encoding apparatus 120. The output unit 207 is realized mainly by the CPU 307, and transmits an encoded video image to the communication network 110. The image storage 208 is realized mainly by a storage device such as the HDD 305, and stores the data of the inputted image and all the data of the various images which are generated until the encoding is completed.

1.3 Processing Sequence in First Embodiment

Figure 3:
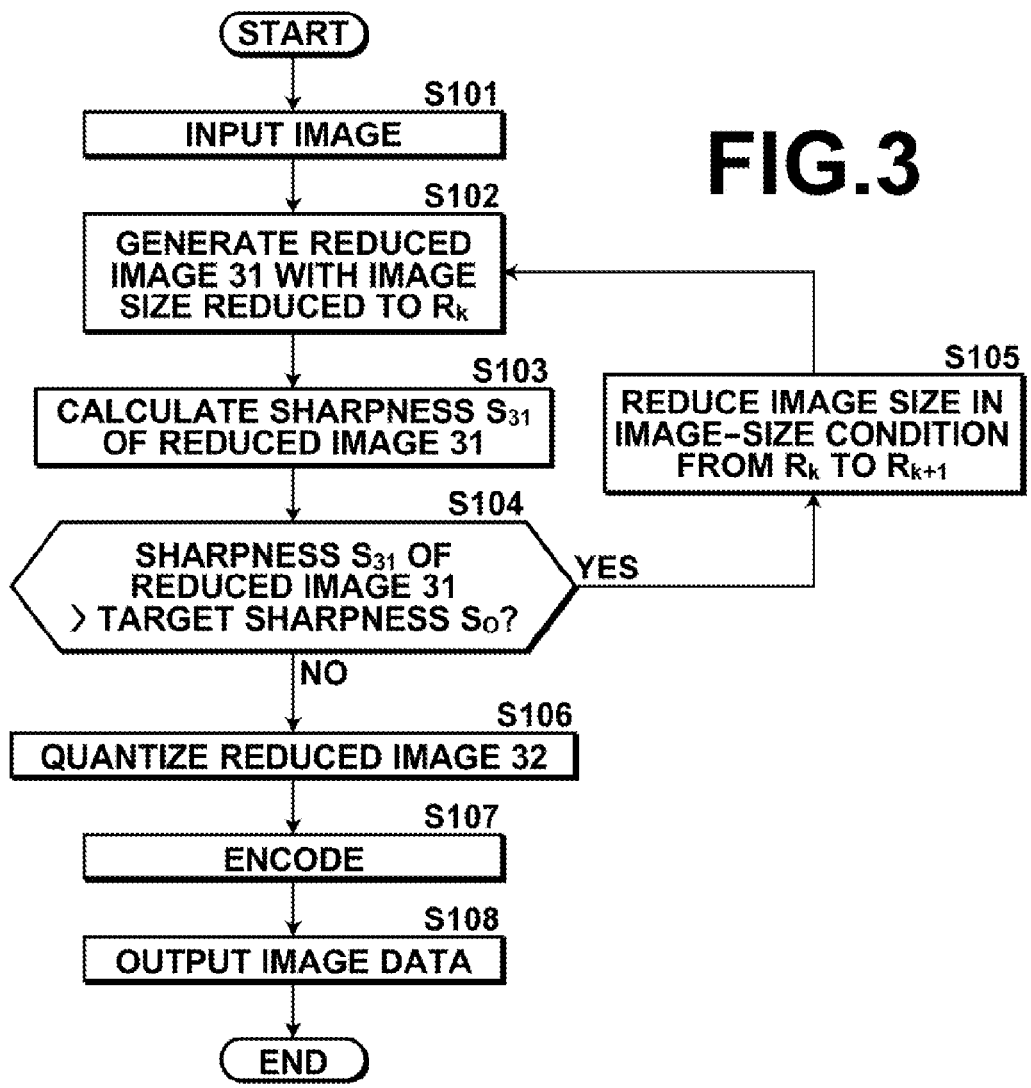
FIG. 3 is a flow diagram illustrating a sequence of processing performed in an image encoding apparatus according to the first embodiment.

A sequence of processing performed in each image encoding apparatus according to the first embodiment is explained below with reference to FIG. 3, which is a flow diagram illustrating the sequence of processing performed in the image encoding apparatus according to the first embodiment.

In step S101, the input unit 200 acquires an inputted image 30.

In step S102, the image-size reduction unit 214 generates a reduced image 31 on the basis of an image-size condition stored in the image-size-condition storage 212. In the reduced image 31, the image size of the inputted image 30 is reduced to the image size $R_k$.

In step S103, the sharpness calculation unit 213 calculates the sharpness $S_{31}$ of the reduced image 31 generated by the image-size reduction unit 214.

In step S104, the image-size control unit 211 compares the sharpness $S_{31}$ of the reduced image 31 with the target sharpness $S_O$ included in the image-size condition. When yes is determined in step S104, i.e., when the sharpness $S_{31}$ of the reduced image 31 is determined to be higher than the target sharpness $S_O$, the operation goes to step S105, and the image size included in the image-size condition is changed from the image size $R_k$ to the image size Rk+1. As mentioned before, each of the values $R_k$, Rk+1, . . . , Rn is smaller than the preceding one of the values $R_1, R_2, \ldots, R_k, R_{k+1}, \ldots, R_n$ by a predetermined ratio. Then, the operations in steps S102 to S105 are repeated until the sharpness $S_{31}$ of the reduced image 31 is determined to reach the target sharpness $S_O$. During this repetition, the image 31 which is reduced in the preceding repetition cycle is reserved.

When no is determined in step S104, i.e., when the sharpness $S_{31}$ of the reduced image 31 is determined to be equal to or lower than the target sharpness $S_O$, the image-size control unit 211 outputs to the quantization unit 234 the reduced image 31 satisfying the target sharpness $S_O$ and having the smallest image size as a reduced image 32.

In step S106, the quantization unit 234 generates a quantized image by performing DCT (discrete cosine transformation) processing of the reduced image 32 and quantization on the basis of the quantization condition stored in the quantization-condition storage 232.

In step S107, the encoding unit 235 generates an encoded image by encoding the quantized image.

In step S108, the output unit 207 transmits the data of the encoded image to the communication network 110.

1.4 Advantages of First Embodiment

As described above, the image encoding apparatus 120 according to the first embodiment reduces the image size while maintaining the sharpness of the reduced image at a level equal to or higher than the target sharpness and thereafter performs subsequent compression processing. Therefore, it is possible to reduce the calculation burden of the subsequent compression processing, and achieve high compression of the image while maintaining the sharpness of the reduced image equal to or higher than the target sharpness without unnecessarily increasing the calculation burden. In addition, since the image size is reduced within the range in which the sharpness is equal to or higher than the target sharpness, it is possible to determine the image size while maintaining the necessary sharpness without redundant calculation.

In addition, according to the first embodiment, until the sharpness of the reduced image reaches the target sharpness, the image-size control unit 211 repeats the operation of changing the image-size condition stored in the image-size-condition storage 212 and the operation of making the image-size control unit 211 produce a reduced image of the inputted image according to the image-size condition in which the image size is reduced. Thereafter, subsequent compression processing is performed. That is, before the subsequent compression processing, the image size is minimized within the range in which the sharpness is equal to or higher than the target sharpness. Therefore, it is possible to reduce the calculation burden of the subsequent compression processing, and achieve high compression of the image while maintaining the sharpness of the reduced image equal to or higher than the target sharpness without unnecessarily increasing the calculation burden.

1.5. Variation of First Embodiment

A variation of the first embodiment is explained below. In the image encoding apparatus as the variation of the first embodiment, a target image quality level (corresponding to the target image quality mentioned in the additional feature (xv) described in the "SUMMARY OF THE INVENTION") is set, and an additional image-size control unit 217 may be provided in addition to the provision in the image encoding apparatus 120 according to the first embodiment. The additional image-size control unit 217 reduces the image size of the inputted image according to the target image quality level.

Figure 4:
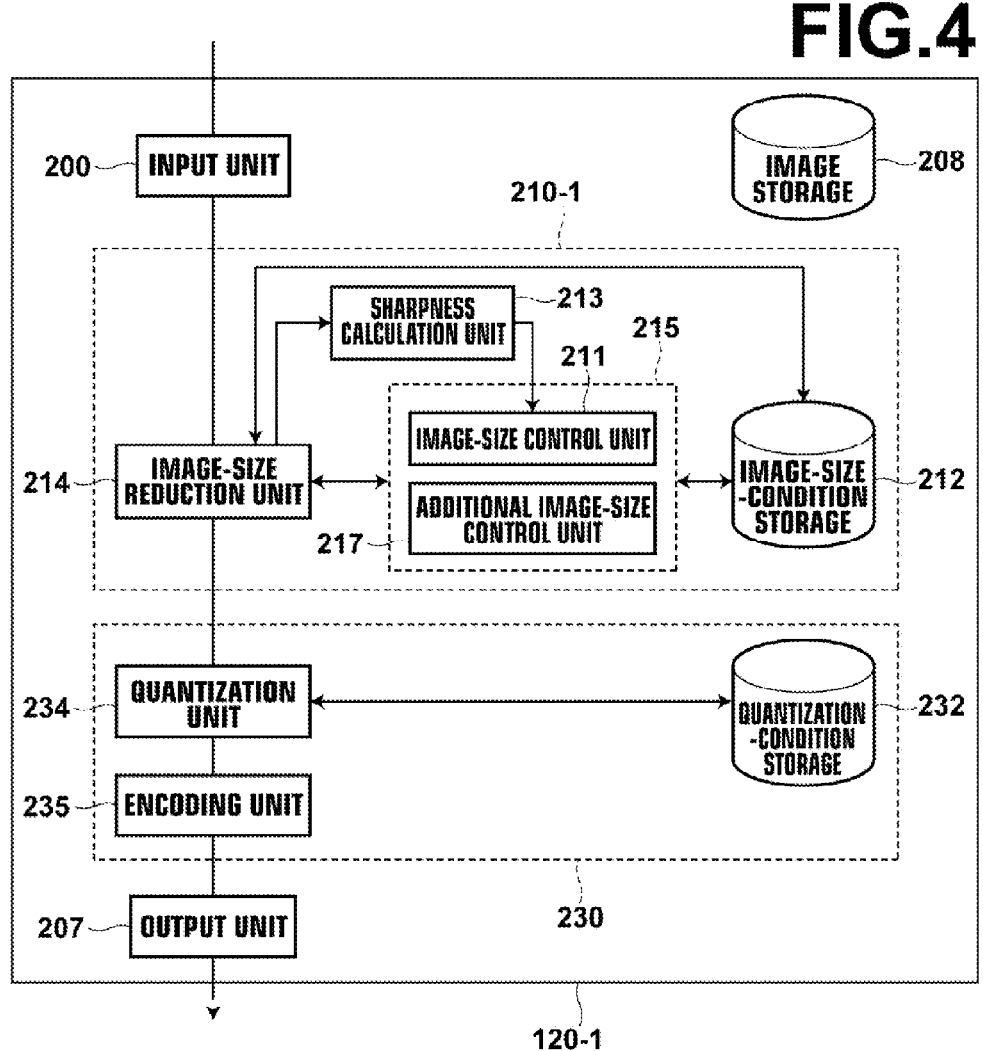
FIG. 4 is a block diagram illustrating functions of an image encoding apparatus 120-1 as a variation of the first embodiment.

FIG. 4 is a block diagram illustrating the functions of an image encoding apparatus 120-1 as the variation of the first embodiment, which can be used as one of the image encoding apparatuses 120a, 120b, and 120c in the configuration of the image processing system 10 illustrated in FIG. 1. In the image encoding apparatus 120-1 as the variation of the first embodiment as illustrated in FIG. 4, the image-size-condition storage 212 stores the image quality level (e.g., the sharpness $S_{30}$ as indicated later) of the inputted image 30 as a target image quality level. In addition, the image encoding apparatus 120-1 as the variation of the first embodiment comprises the additional image-size control unit 217. The additional image-size control unit 217 reduces the image size (where m is a natural number) included in the image-size condition stored in the image-size-condition storage 212 from the image size $R'_m$ to the image size $R'_{m-1}$ and makes the image-size reduction unit 214 produce a reduced image 31 of the inputted image so that the reduced image 31 has the image size reduced by the additional image-size control unit 217 and the image quality of the above reduced image 31 is equal to or superior to the above target image quality level $S_{30}$, before the image-size control unit 211 reduces the image size in the image-size condition and makes the image-size reduction unit 214 produce the reduced image of the inputted image. (As illustrated in FIG. 4, the image-size control unit 211 and the additional image-size control unit 217 constitute an image-size control processing unit 215.)

In the variation of the first embodiment, the image-size-condition storage 212 stores the image quality level of the inputted image 30 as the above image quality level $S_{30}$. Specifically, the index indicating the image size which is set in the image-size condition for the operation of the additional image-size control unit 217 is a value of the resolution $R'_m$, which is selected from among another set of candidate values $R'_1, R'_2, \ldots, R'_m, R'_{m+1}, \ldots, R'_{n'}$ of the resolution. The candidate values $R'_1, R'_2, \ldots, R'_m, R'_{m-1}, \ldots, R'_{n'}$ decrease in this order. For example, each of the values $R'_1, R'_2, \ldots, R'_m, R'_{m+1}, \ldots, R'_{n'}$ is smaller than the preceding one of the values $R'_1, R'_2, \ldots, R'_m, R'_{m+1}, \ldots, R'_{n'}$ by a predetermined ratio. The predetermined ratio by which each of the values $R'_1, R'_2, \ldots, R'_m, R'_{m+1}, \ldots, R'_{n'}$ is smaller than the preceding one of the values $R'_1, R'_2, \ldots, R'_m, R'_{m+1}, \ldots, R'_{n'}$ may be identical to or different from the predetermined ratio by which each of the values $R_1, R_2, \ldots, R_k, R_{k+1}, \ldots, R_n$ is smaller than the preceding one of the values $R_1, R_2, \ldots, R_k, R_{k+1}, \ldots, R_n$. In addition, the number n' of the candidate values $R'_1, R'_2, \ldots, R'_m, R'_{m+1}, \ldots, R'_{n'}$ may be different from the number n of the candidate values $R_1, R_2, \ldots, R_k, R_{k+1}, \ldots, R_n$.

In the variation of the first embodiment, the sharpness $S_{30}$ of the inputted image 30 is used as the target image quality level. However, the target image quality level may be defined by a signal-to-noise ratio, a block noise amount, a linear sum of the block noise amount and an edge amount, or a combination of these indexes expressed by an appropriately provided formula.

The additional image-size control unit 217 is realized mainly by the CPU 307, and has approximately similar functions to the image-size control unit 211. However, before the image-size control unit 211 reduces the image size in the image-size condition and makes the image-size reduction unit 214 produce the reduced image of the inputted image, the additional image-size control unit 217 reduces the image size $S_{30}$ of the inputted image 30 to the image size corresponding to the one $R'_m$, of the values $R'_1, R'_2, \ldots, R'_m, R'_{m+1}, \ldots, R'_{n'}$ of the resolution in consideration of the image quality of the inputted image (i.e., the sharpness $S_{30}$ of the inputted image 30) as the target image quality level. Specifically, the additional image-size control unit 217 reduces the image size $S_{30}$ of the inputted image 30 to the image size corresponding to the resolution $R'_m$, and makes the image-size reduction unit 214 produce a reduced image of the inputted image 30 so that the reduced image has the image size reduced by the additional image-size control unit 217 and the image quality of the reduced image 31 is equal to or superior to the above target image quality level $S_{30}$, before the aforementioned image-size control unit 211 reduces the image size in the image-size condition and makes the image-size reduction unit 214 produce the reduced image 31 of the inputted image as mentioned before. For example, the additional image-size control unit 217 repeats the operation of reducing the image size included in the image-size condition stored in the image-size-condition storage 212 and the operation of making the image-size reduction unit produce a reduced image of the inputted image having the reduced image size, within the range in which the image quality of the reduced image 31 does not fall below the above target image quality level $S_{30}$. In this case, the additional image-size control unit 217 makes the image-size reduction unit 214 reduce the inputted image 30 to the image size corresponding to the resolution $R_m$ in the m-th repetition.

Figure 5:
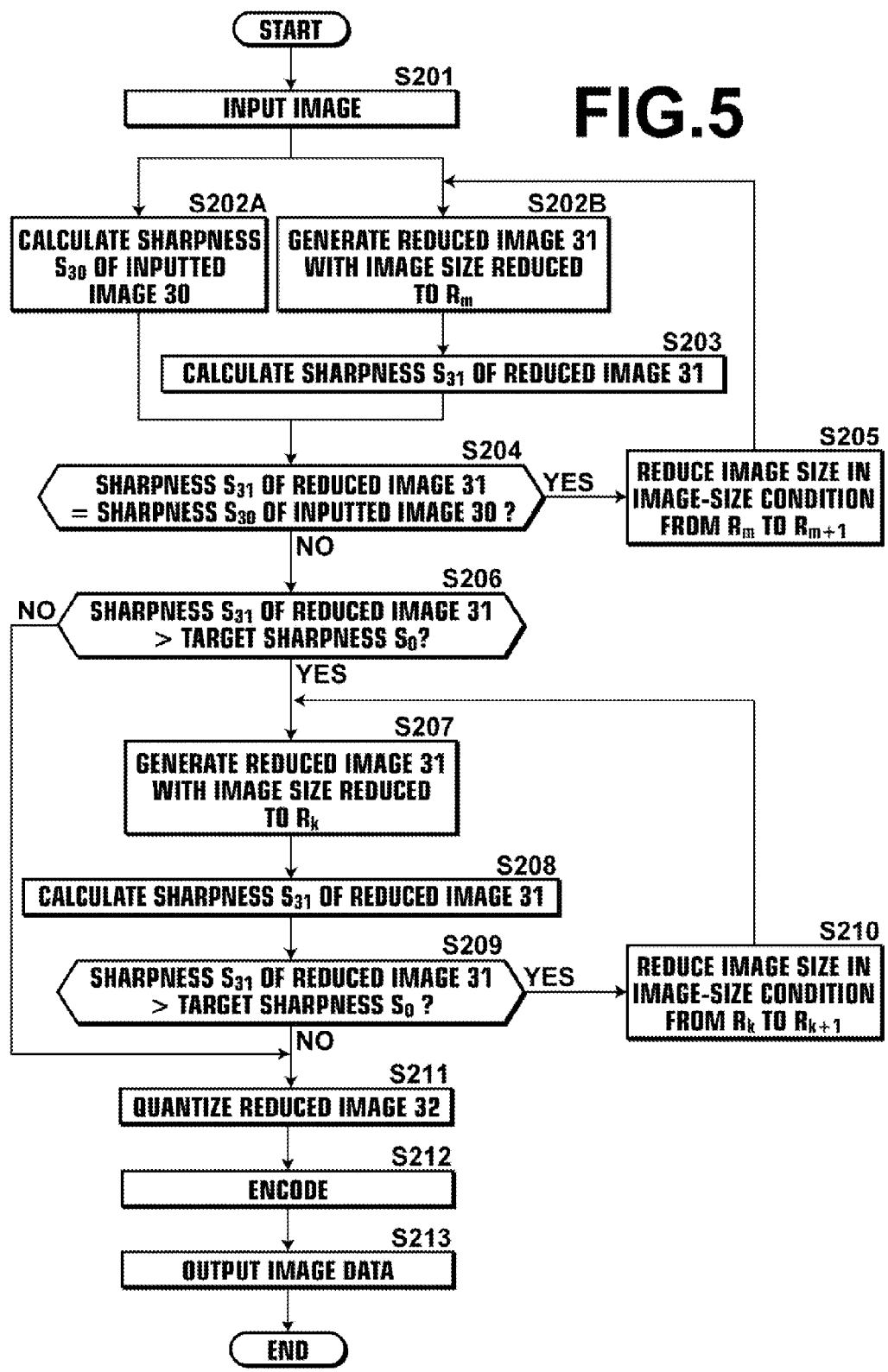
FIG. 5 is a flow diagram illustrating a sequence of processing performed in the image encoding apparatus as the variation of the first embodiment.

A sequence of processing performed in an image encoding apparatus as the variation of the first embodiment is explained below with reference to FIG. 5, which is a flow diagram illustrating the sequence of processing performed in the image encoding apparatus as the variation of the first embodiment.

In step S201, the input unit 200 acquires an inputted image 30.

In step S202A, the sharpness calculation unit 213 calculates the sharpness $S_{30}$ of the inputted image 30.

In step S202B, the image-size reduction unit 214 generates a reduced image 31 on the basis of an image-size condition stored in the image-size-condition storage 212. In the reduced image 31, the image size of the inputted image 30 is reduced to the image size $R_m$.

In step S203, the sharpness calculation unit 213 calculates the sharpness $S_{31}$ of the reduced image 31 generated by the image-size reduction unit 214.

In step S204, the image-size control unit 211 compares the calculated sharpness $S_{31}$ of the reduced image 31 with the sharpness $S_{30}$ of the inputted image 30 included in the image-size condition. When yes is determined in step S204, i.e., when the sharpness $S_{31}$ of the reduced image 31 is determined to be equal to the sharpness $S_{30}$ of the inputted image 30, the operation goes to step S205, and the image size included in the image-size condition is changed from the image size $R_m$ to the image size $R_{m+1}$. Then, the operations in steps S202B to S205 are repeated until the sharpness $S_{31}$ of the reduced image 31 is determined to reach the sharpness $S_{30}$ of the inputted image 30. During this repetition, the image 31 which is reduced in the preceding repetition cycle is reserved.

When no is determined in step S204, i.e., when the sharpness $S_{31}$ of the reduced image 31 is determined to fall below the sharpness $S_{30}$ of the inputted image 30, the operation goes to step S206. In step S206, the image-size control unit 211 compares the sharpness $S_{31}$ of the reduced image 31 with the target sharpness $S_O$ in the image-size condition. When yes is determined in step S206, i.e., when the sharpness $S_{31}$ of the reduced image 31 is higher than the target sharpness $S_O$ in the image-size condition, the operation goes to step S207. When no is determined in step S206, i.e., when the sharpness $S_{31}$ of the reduced image 31 is equal to or lower than the target sharpness $S_O$ in the image-size condition, the image-size control unit 211 outputs to the quantization unit 234 the last reduced image 32, which is the reduced image satisfying the target sharpness $S_O$ and having the smallest image size. Then, the operation goes to step S211.

The operations performed in steps S207 to S213 are similar to the operations performed in steps S102 to S108. Therefore, explanation on the operations in steps S207 to S213 is not indicated.

In the variation of the first embodiment, before the image-size control unit 211 reduces the image size in the image-size condition and makes the image-size reduction unit 214 produce the reduced image 31 of the inputted image as mentioned before, the additional image-size control unit 217 reduces the image size in the image-size condition and makes the image-size reduction unit 214 produce a reduced image of the inputted image 30 within the range in which the image quality of the reduced image 31 does not fall below the above target image quality level. Therefore, it is possible to reduce the calculation burden of the subsequent compression processing, and achieve high compression of the image while maintaining the sharpness of the reduced image equal to or higher than the target sharpness without unnecessarily increasing the calculation burden.

Although the image quality of the inputted image is used as the target image quality level in the variation of the first embodiment, the target image quality level is not limited to the image quality of the inputted image, and the image quality can be defined in various manners. For example, the target image quality level may be defined by the sharpness, a signal-to-noise ratio, a block noise amount, a linear sum of the block noise amount and an edge amount, or a combination of these indexes expressed by an appropriately provided formula. Further, more than one index of the image quality may be concurrently used.

In the case where the target image quality level is the image quality of the inputted image as in the variation of the first embodiment, a reduced image having the minimum image size can be produced within the range in which the sharpness of the inputted image is not degraded, so that it is possible to reduce the calculation burden of the subsequent encoding processing while maintaining the sharpness of the inputted image.

2. Second Embodiment
2.1 Functions of Second Embodiment

Figure 6:
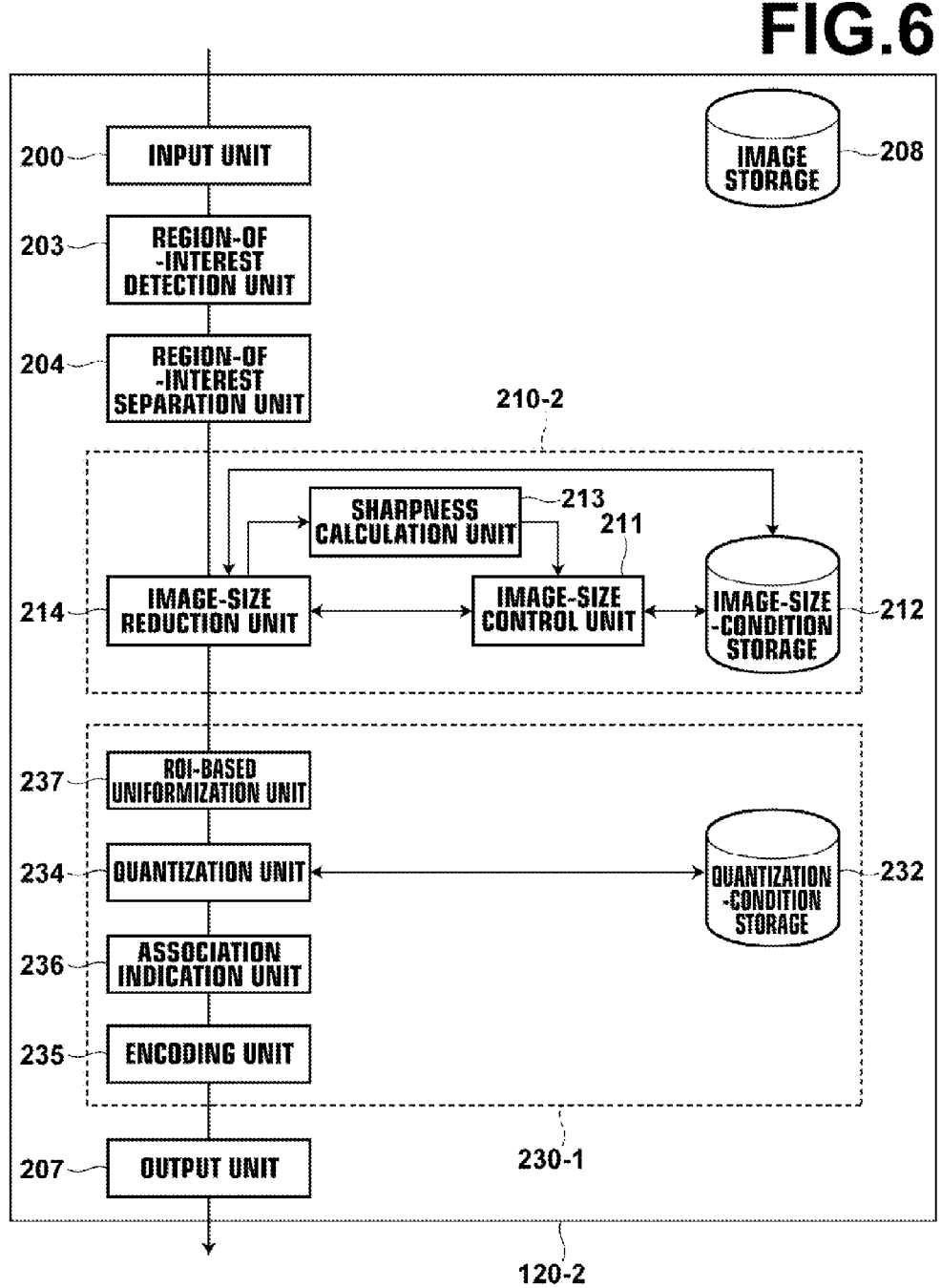
FIG. 6 is a block diagram illustrating functions of an image encoding apparatus 120-2 according to a second embodiment of the present invention.

FIG. 6 is a block diagram illustrating functions of an image encoding apparatus 120-2 according to the second embodiment, which can be used as one of the image encoding apparatuses 120a, 120b, and 120c in the configuration of the image processing system 10 illustrated in FIG. 1.

As illustrated in FIG. 6, the image encoding apparatus 120-2 comprises a region-of-interest detection unit 203 and a region-of-interest separation unit 204 in addition to the functions of the image encoding apparatus 120 according to the first embodiment. The region-of-interest detection unit 203 detects a plurality of regions of interest respectively receiving different degrees of interest from an inputted image or a reduced image of the inputted image (in which the image size is reduced). The region-of-interest separation unit 204 generates region-of-interest images respectively representing the plurality of regions of interest from the inputted image or the reduced image of the inputted image. In the second embodiment, the image-size-condition storage 212 separately stores target degrees of sharpness respectively set for the region-of-interest images, and the image-size control unit 211 determines image-size conditions respectively set for the plurality of regions of interest, and obtains a plurality of ROI-based reduced images respectively corresponding to the plurality of regions of interest, where each of the plurality of ROI-based reduced images represents the inputted image and has the sharpness equal to one of the target degrees of sharpness corresponding to the ROI-based reduced image.

Further, the image encoding apparatus 120-2 also comprises an association indication unit 236, which attaches to the region-of-interest images information indicating the association between the region-of-interest images before supplying the quantized images to the encoding unit 235. Furthermore, it is preferable that the image encoding apparatus 120-2 comprise an ROI-based uniformization unit 237, which is explained later.

The region-of-interest detection unit 203 is realized mainly by the CPU 307, and detects from each of a plurality of constituent frames constituting a video image the plurality of regions of interest respectively receiving different degrees of interest, according to the feature quantities of the plurality of regions of interest. The feature quantities include the type of an object, the dimensions of the object, the moving speed of a moving object, and the dimensions of a region of interest. The manner of detection of a region of interest is explained in detail later.

Figure 7:
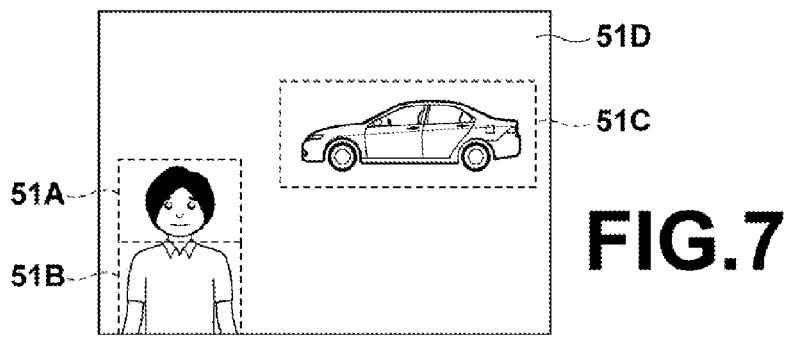
FIG. 7 is a diagram schematically illustrating examples of regions of interest in the second embodiment.
Figure 8A:
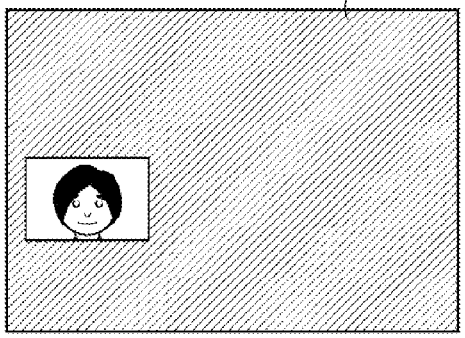
FIGS. 8A, 8B, 8C, and 8D are diagrams schematically illustrating examples of partially uniformized, ROI-based reduced images, in each of which portions other than a portion corresponding to one of the regions of interest are uniformized to a fixed value according to the second embodiment.
Figure 8B:
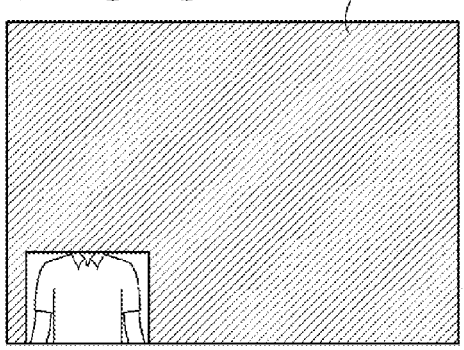
Figure 8C:
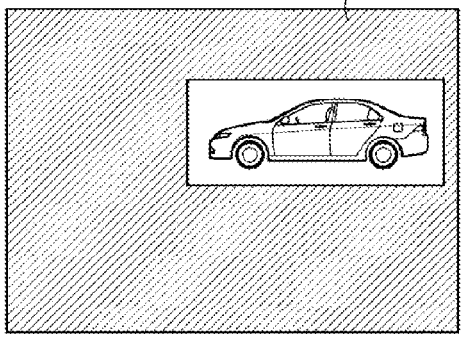
Figure 8D:
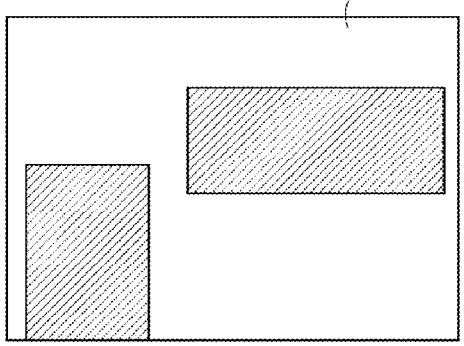

FIG. 7 schematically illustrates an example of an inputted image having regions of interest in the second embodiment. The example of FIG. 7 has a human head region as a region of interest 51A, a human body region as a region of interest 51B, a motion region as a region of interest 51C, and a human background region as a region of interest 51D. The human head region, the human body region, the motion region, and the background region (the regions of interest 51A, 51B, 51C, and 51D) receive degrees of interest decreasing in this order. However, generally, it is possible to set a plurality of regions of interest as many as necessary, and set the degrees of interest in the plurality of regions of interest as necessary.

The image encoding apparatuses disclosed in this specification treat as a region of interest two or more regions receiving identical degrees of interest in an image. For example, even in the case where two human head regions separately exist in an image, the image encoding apparatuses treat the combination of the two human head regions as a region of interest 51A since the two human head regions receive the identical degree of interest. That is, the image encoding apparatuses perform identical processing on both of the two human head regions.

The region-of-interest separation unit 204 is realized mainly by the CPU 307, and generates the plurality of region-of-interest images from each of the plurality of constituent frames.

In the case where a plurality of ROI-based reduced images (reduced images of the region-of-interest images) are generated by compression of a video image performed by the quantization processing unit 230-1, the association indication unit 236 attaches to the ROI-based reduced images information indicating the association between the ROI-based reduced images, so that data of a plurality of region-of-interest video images are generated. For example, the association indication unit 236 attaches tag information or the like to the ROI-based reduced images. The output unit 207 transmits to the communication network 110 the video data containing the plurality of ROI-based reduced images.

The ROI-based uniformization unit 237 is realized mainly by the CPU 307, and partially uniformizes the inputted image. Specifically, the ROI-based uniformization unit 237 uniformizes (changes the pixel values in) the inputted image except for the corresponding region of interest in each of the ROI-based reduced images to a fixed value. FIGS. 8A, 8B, 8C, and 8D are diagrams schematically illustrating examples of partially uniformized, ROI-based reduced images, in each of which portions other than a portion corresponding to one of the regions of interest in the inputted image of FIG. 7 are uniformized to a fixed value according to the second embodiment. For example, the ROI-based uniformization unit 237 generates a partially uniformized image 33A in which portions other than a portion A corresponding to the region of interest 51A are uniformized to a predetermined value (zero brightness in this example) on the basis of the reduced image (ROI-based reduced image) 32A corresponding to the region of interest 51A, a partially uniformized image 33B in which portions other than a portion B corresponding to the region of interest 51B are uniformized to a predetermined value on the basis of the reduced image (ROI-based reduced image) 32B corresponding to the region of interest 51B, a partially uniformized image 33C in which portions other than a portion C corresponding to the region of interest 51C are uniformized to a predetermined value on the basis of the reduced image (ROI-based reduced image) 32C corresponding to the region of interest 51C, and a partially uniformized image 33D in which portions other than a portion D corresponding to the region of interest 51D are uniformized to a predetermined value on the basis of the reduced image (ROI-based reduced image) 32D corresponding to the region of interest 51D. Thereafter, the quantization unit 234 quantizes each of the partially uniformized, ROI-based reduced images 33A, 33B, 33C, and 33D under a quantization condition corresponding to the degree of interest in the corresponding one of the regions of interest 51A, 51B, 51C, and 51D.

As explained above, the ROI-based uniformization unit 237 reduces the amount of information in the reduced image corresponding to each region of interest by uniformizing the pixel values in portions of the reduced image other than a portion corresponding to the region of interest to a fixed value, before encoding the reduced image of the corresponding region-of-interest image. The fixed value may be an arbitrarily set value as long as the ROI-based uniformization unit 237 can reduce the amount of information in the reduced image corresponding to each region of interest. That is, according to the second embodiment, the provision of the ROI-based uniformization unit 237 can reduce the amount of information in the reduced image corresponding to each region of interest, and suppress increase in the calculation burden of the encoding processing.

2.2 Processing Sequence in Second Embodiment

A sequence of processing performed in an image encoding apparatus according to the second embodiment is explained below with reference to FIGS. 9 and 10, where FIG. 9 is a flow diagram illustrating the sequence of processing performed in the image encoding apparatus according to the second embodiment, and FIG. 10 shows examples of image-size conditions.

In step S301, the input unit 200 acquires an inputted image 30.

In step S302, the region-of-interest detection unit 203 detects the regions of interest 51A, 51B, 51C, and 51D from the inputted image 30, and the region-of-interest separation unit 204 generates base images 30A, 30B, 30C, and 30D for the reduced images (ROI-based reduced images) 32A, 32B, 32C, and 32D corresponding to the types of the regions of interest 51A, 51B, 51C, and 51D by duplicating the inputted image 30.

In steps S303A, S303B, S303C, and S303D, the image-size control unit 211 generates the ROI-based reduced images 32A, 32B, 32C, and 32D having the smallest image sizes satisfying the target degrees $S_{OA}$, $S_{OB}$, $S_{OC}$, and $S_{OD}$ of the sharpness (respectively corresponding to the base images 30A, 30B, 30C, and 30D) by repeating the operations similar to steps S102 to S105 (indicated in FIG. 3 for the first embodiment) on the basis of the image-size conditions stored in the image-size-condition storage 212 until the degrees of sharpness of the base images 30A, 30B, 30C, and 30D respectively reach the minimum degrees of sharpness satisfying the target degrees $S_{OA}$, $S_{OB}$, $S_{OC}$, and $S_{OD}$ of the sharpness.

In the examples indicated in FIG. 10, the target degrees $S_{OA}$, $S_{OB}$, $S_{OC}$, and $S_{OD}$ of the sharpness and the initial values $R_{A1}$, $R_{B1}$, $R_{C1}$, and $R_{D1}$ of the resolution as the initial values of the image sizes are set in the image-size conditions 71 stored in the image-size-condition storage 212, where each of the initial values $R_{A1}$, $R_{B1}$, $R_{C1}$, and $R_{D1}$ of the resolution is one of the aforementioned candidates values $R_k$. In the examples indicated in FIG. 10, the target degrees $S_{OA}$, $S_{OB}$, $S_{OC}$, and $S_{OD}$ of the sharpness decrease with the degrees of interest, i.e., the target degrees $S_{OA}$, $S_{OB}$, $S_{OC}$, and $S_{OD}$ of the sharpness decrease in this order. In addition, the values $R_{Ak}$, $R_{Bk}$, $R_{Ck}$, and $R_{Dk}$ of the resolution of the ROI-based reduced images 32A, 32B, 32C, and 32D generated in steps S303A, S303B, S303C, and S303D are also set in the image-size conditions 71. (Although the image-size-condition storage 212 also stores the aforementioned set of candidate values $R_1$, $R_2$, ..., $R_k$, $R_{k+1}$, ..., $R_n$ of the resolution, the candidate values other than the value $R_k$ are not shown in FIG. 10.)

In steps S304A, S304B, S304C, and S304D, the quantization unit 234 quantizes the ROI-based reduced images 32A, 32B, 32C, and 32D in a similar manner to the first embodiment, and generates quantized, ROI-based reduced images 35A, 35B, 35C, and 35D. At this time, it is preferable that the ROI-based uniformization unit 237 generate partially uniformized, ROI-based reduced images 33A, 33B, 33C, and 33D before steps S304A, S304B, S304C, and S304D by performing uniformization of the ROI-based reduced images 32A, 32B, 32C, and 32D as explained before, and the quantization unit 234 quantize the partially uniformized, ROI-based reduced images 33A, 33B, 33C, and 33D (instead of the ROI-based reduced images 32A, 32B, 32C, and 32D) in steps S304A, S304B, S304C, and S304D. Since the portions other than a portion corresponding to the region of interest in each of the ROI-based reduced images are uniformized to a fixed value before the quantization, the amount of information in the portions of the ROI-based reduced image corresponding to each region of interest other than the portion corresponding to the region of interest is reduced. Therefore, it is possible to reduce the amount of information in the ROI-based reduced images, and suppress increase in the calculation burden of the encoding processing.

In step S305, the association indication unit 236 attaches tag information to each of the quantized, ROI-based reduced images 35A, 35B, 35C, and 35D for indicating the association between the quantized, ROI-based reduced images 35A, 35B, 35C, and 35D.

In step S306, the encoding unit 235 encodes the quantized, ROI-based reduced images 35A, 35B, 35C, and 35D and the tag information indicating the association between the quantized, ROI-based reduced images 35A, 35B, 35C, and 35D, so that encoded, ROI-based reduced images 37A, 37B, 37C, and 37D are generated.

In step S307, the output unit 207 transmits to the communication network 110 the video data including the data of the encoded, ROI-based reduced images 37A, 37B, 37C, and 37D and the encoded tag information.

2.3 Advantages of Second Embodiment

The image encoding apparatuses 120 according to the second embodiment can prevent excessive reduction of the image size of the ROI-based reduced image corresponding to each region of interest the image size of which is not to be reduced, and can greatly reduce the image size of the ROI-based reduced image corresponding to each region of interest the image size of which can be reduced. Therefore, it is possible to effectively reduce the image size of the ROI-based reduced image corresponding to each region of interest to the level corresponding to the degree of interest in the region of interest before the subsequent processing for compression while maintaining the target degree of sharpness corresponding to the degree of interest in the region of interest. Thus, it is possible to effectively reduce the calculation burden, and achieve high compression of the image while maintaining the sharpness equal to or higher than the target sharpness without unnecessarily increasing the calculation burden.

In addition, according to the second embodiment, the target degrees of sharpness respectively determined for the human head region, the human body region, the motion region, and the background region are set so as to decrease in this order in correspondence with the degrees of interest in the human head region, the human body region, the motion region, and the background region. Therefore, the image size of each of the reduced images of the region-of-interest images is minimized within the range satisfying the corresponding target degree of sharpness. Thus, it is possible to prevent excessive reduction in the image size of the ROI-based reduced image corresponding to each region of interest the image size of which is not to be reduced, and can greatly reduce the image size of the ROI-based reduced image corresponding to each region of interest the image size of which can be reduced. In addition, before subsequent compression processing, the image size of the ROI-based reduced image corresponding to each region of interest is effectively reduced to the level corresponding to the degree of interest in the region of interest while the target degree of sharpness corresponding to the degree of interest in the region of interest is maintained. Consequently, it is possible to effectively reduce the calculation burden, and achieve high compression of the image while maintaining the sharpness equal to or higher than the target sharpness without unnecessarily increasing the calculation burden.

2.4 Variations of Second Embodiment

In a variation of the second embodiment, the quantization processing unit 230-1 may compress the plurality of ROI-based reduced images under control of a quantization control unit (not shown) by quantizing the plurality of ROI-based reduced images with values which are set according to the corresponding feature quantities, respectively. For example, the quantization unit 234 in the quantization processing unit 230-1 may compress the plurality of ROI-based reduced images by quantizing the plurality of ROI-based reduced images with quantization parameters corresponding to the feature quantities, respectively. Specifically, the quantization parameters are set so that the relatively small compression ratios are applied to ROI-based reduced images corresponding to regions of interest receiving relatively high degrees of interest. In this case, the quantization can be performed with different compression ratios according to the degrees of interest in the regions of interest, so that the efficiency in the compression can be increased.

Although only the single quantization unit 234 and the single encoding unit 235 are arranged in the image encoding apparatus 120-2 illustrated in FIG. 6, multiple quantization units or multiple encoding units may be provided in the image encoding apparatus. Alternatively, one or more than one quantization unit and one or more than one encoding unit may be provided for each of the regions of interest.

3. Third Embodiment

Figure 11:
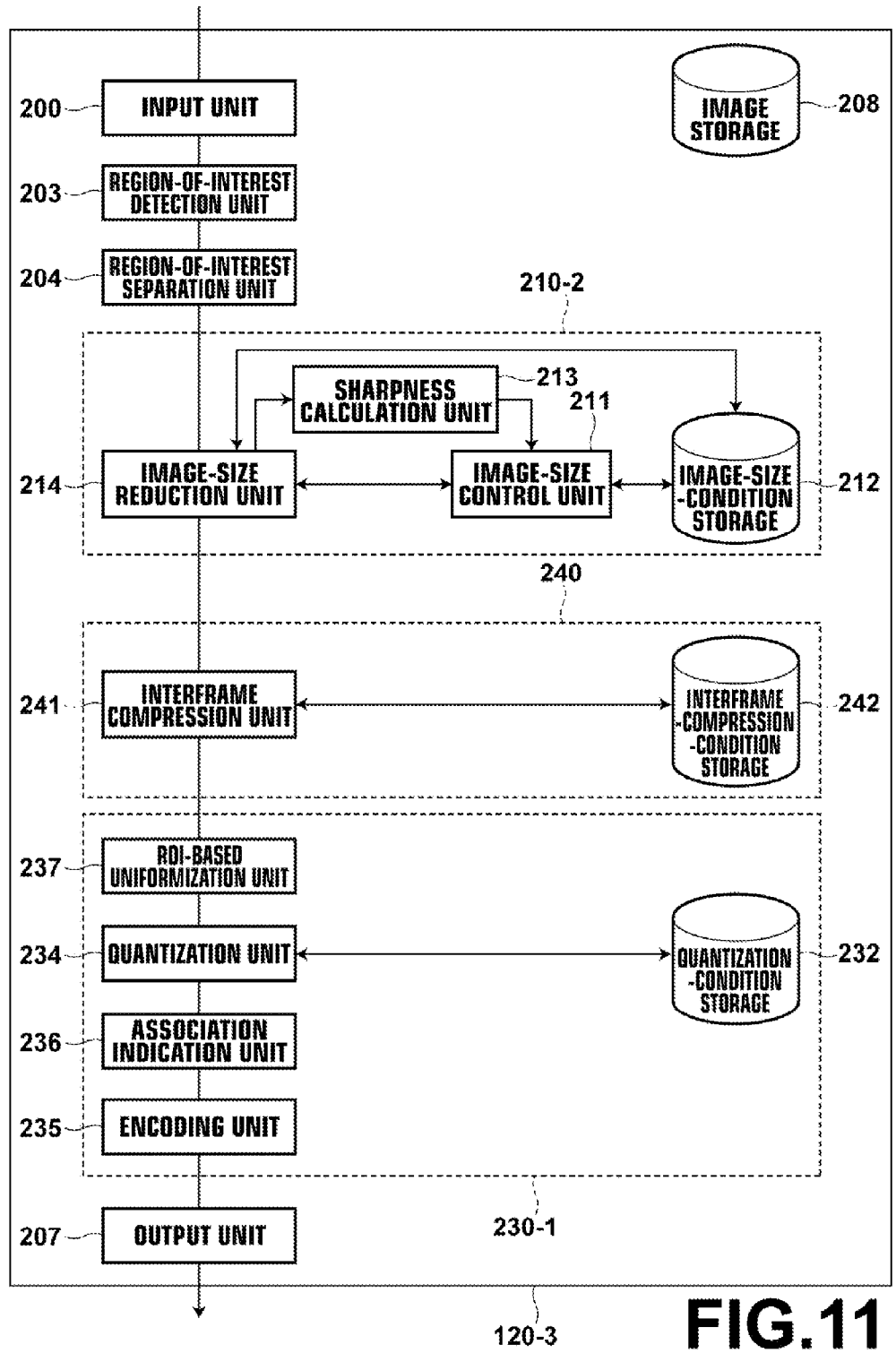
FIG. 11 is a block diagram illustrating functions of an image encoding apparatus 120-3 according to a third embodiment of the present invention.

FIG. 11 is a block diagram illustrating functions of an image encoding apparatus 120-3 according to the third embodiment, which can be used as one of the image encoding apparatuses 120a, 120b, and 120c in the configuration of the image processing system 10 illustrated in FIG. 1.

As illustrated in FIG. 11, the image encoding apparatus 120-3 comprises an interframe-compression processing unit 240. The interframe-compression processing unit 240 includes an interframe-compression-condition storage 242 and an interframe compression unit 241. The interframe-compression-condition storage 242 stores an interframe-compression condition, which is a condition for compressing each of portions (region-of-interest videos) of a video image respectively corresponding to a plurality of regions of interest along the time direction, where the video image is constituted by a plurality of (constituent) frames which are inputted into the image encoding apparatus 120-3. The interframe compression unit 241 compresses the video image along the time direction in accordance with the interframe-compression condition. The interframe-compression-condition storage 242 is realized mainly by a storage device such as the HDD 305. In the interframe-compression condition, the compression ratio of the region-of-interest video corresponding to each of the plurality of regions of interest is set so that the compression ratio is relatively low when the degree of interest in the regions of interest is relatively high.

Specifically, in the third embodiment, each frame which constitutes the video image and has the regions of interest contains macroblocks, and the interframe-compression condition contains the rate at which the macroblock type is changed into the skip macroblock in macroblocks in a region-of-interest video corresponding to each of the plurality of regions of interest. The interframe-compression condition is set so that the rate at which the macroblock type is changed into the skip macroblock in the macroblocks in the region-of-interest video corresponding to each of the plurality of regions of interest is relatively low when the degree of interest in the region of interest is relatively high. The interframe-compression-condition storage 242 lowers the frame rate by changing the macroblock type into the skip macroblock in the macroblocks in each region-of-interest video.

Figure 12:
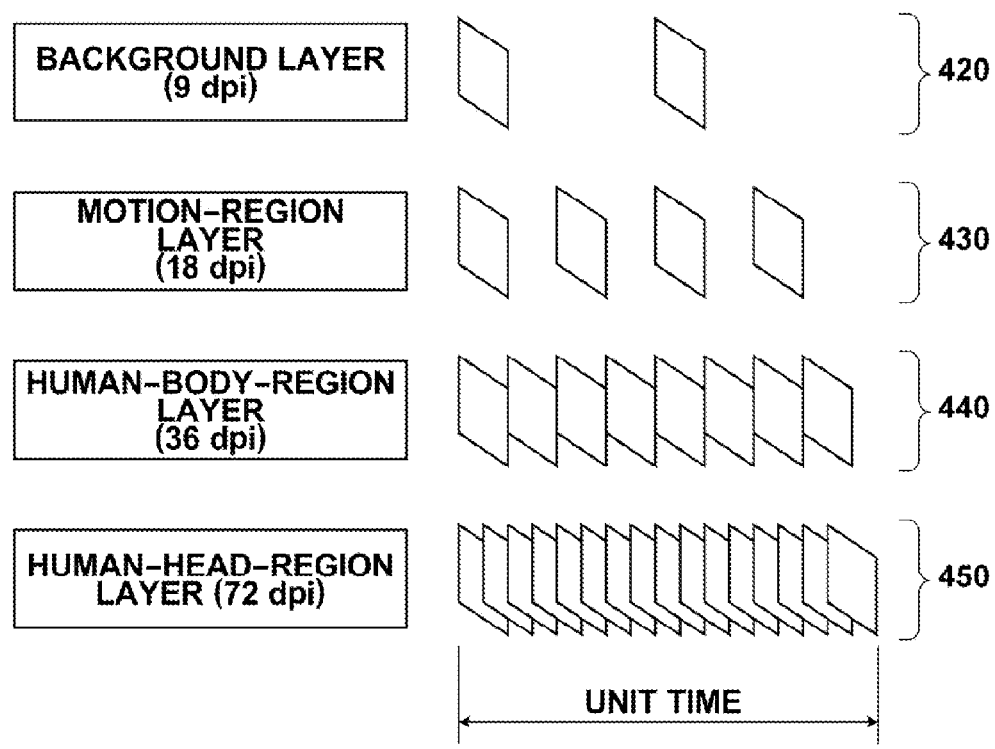
FIG. 12 is a diagram schematically illustrating a plurality of series of ROI-based reduced images respectively constituting the region-of-interest videos.

FIG. 12 schematically illustrates a plurality of series of ROI-based reduced images respectively constituting the region-of-interest videos 450, 440, 430, and 420. According to the third embodiment, it is assumed that the degrees of interest in the human head region, the human body region, the motion region, and the background region decrease in this order, so that the rates at which the macroblock type is changed into the skip macroblock in the region-of-interest video 450 corresponding to the human head region, the region-of-interest video 440 corresponding to the human body region, the region-of-interest video 430 corresponding to the motion region, and the region-of-interest video 420 corresponding to the background region (illustrated in FIG. 12) increase in this order. Therefore, the rate of skipped macroblocks (i.e., the rate of macroblocks unchanged from preceding frames) increases with decrease in the degree of interest.

The interframe-compression condition is not limited to the above specific example as long as the interframe-compression condition indicates a degree of compression of the video image along the time direction. For example, it is possible to decrease the frame rate by actually lowering the frame update rate of the screen.

The manner of generation of the region-of-interest video 450 corresponding to the human head region, the region-of-interest video 440 corresponding to the human body region, the region-of-interest video 430 corresponding to the motion region, and the region-of-interest video 420 corresponding to the background region is explained below.

First, a plurality of frames constituting a picked-up video image 410 (as inputted images) are successively inputted into the image encoding apparatus 120-3 according to the third embodiment. Then, as in steps S301 to S303 (indicated in FIG. 9) in the second embodiment, the base images 30A, 30B, 30C, and 30D for ROI-based reduced images corresponding to the human head region 51A, the human body region 51B, the motion region 51C, and the background region 51D are generated from each of the inputted frames, and the reduced images (ROI-based reduced images) 32A, 32B, 32C, and 32D corresponding to the regions of interest 51A, 51B, 51C, and 51D are obtained by reduction of the image size according to the target sharpness for each region of interest. Since the ROI-based reduced images 32A, 32B, 32C, and 32D are obtained from each of the successively inputted frames, the region-of-interest video 450 corresponding to the human head region, the region-of-interest video 440 corresponding to the human body region, the region-of-interest video 430 corresponding to the motion region, and the region-of-interest video 420 corresponding to the background region, respectively constituted by the ROI-based reduced images 32A, 32B, 32C, and 32D, are obtained.

When the interframe compression unit 241 compresses the video image along the time direction on the basis of the interframe-compression condition, according to the third embodiment, the interframe compression unit 241 sets "skip macroblock" as the macroblock type contained in the frames of the base images 30A, 30B, 30C, and 30D at the rate indicated in the interframe-compression condition.

The compression of a video image along the time direction according to the third embodiment is explained by way of example with reference to FIG. 12. For convenience of explanation, it is assumed that the frame rate of the picked-up video image acquired by the input unit 200 is 16 frames per second (fps), and the resolution of each frame constituting the picked-up video image is 72 dots per inch (dpi).

The frames constituting the region-of-interest videos 450, 440, 430, and 420, respectively corresponding to the human head region, the human body region, the motion region, and the background region, are generated by operations similar to steps S301 to S303A, S303B, and S303C. In the region-of-interest videos 450, 440, 430, and 420, the ROI-based reduced images corresponding to regions of interest 51A, 51B, 51C, and 51D are respectively reduced to the minimum image sizes satisfying the individual target degrees of sharpness, so that the ROI-based reduced images respectively have the degrees of resolution of 72 dpi, 36 dpi, 18 dpi, and 9 dpi.

The interframe-compression condition stored in the interframe-compression-condition storage 242 is such that the rates of setting of the skip macroblock in the region-of-interest videos 450, 440, 430, and 420 (in which the image quality is reduced) increase in this order according to the degrees of interest in the corresponding regions of interest. In the example of FIG. 12, the interframe-compression condition is assumed to be determined so that the relative rates of reduction of the frame rate in the region-of-interest videos 450, 440, 430, and 420 are 1, 2, 4, and 8, respectively. According to the third embodiment, the reduction of the frame rate in each region-of-interest video in which the frame rate is to be lowered is realized by setting the macroblock type to the skip macroblock in all the macroblocks in each of a part of the frames constituting the region-of-interest video in which the frame rate is to be lowered, i.e., by substantial omission of interframe encoding at each of part of the frames constituting the region-of-interest video. Specifically, the interframe compression unit 241 reduces the frame rate of the region-of-interest video 440 by half by setting the macroblock type to the skip macroblock in all the macroblocks in each of half of the frames constituting the region-of-interest video 440, reduces the frame rate of the region-of-interest video 430 to one-fourth by setting the macroblock type to the skip macroblock in all the macroblocks in each of three-fourths of the frames constituting the region-of-interest video 430, and reduces the frame rate of the region-of-interest video 420 to one-eighth by setting the macroblock type to the skip macroblock in all the macroblocks in each of seven-eighths of the frames constituting the region-of-interest video 420. Thus, the frame rates illustrated in FIG. 12 are realized.

However, the manner of setting the skip macroblock in the macroblocks for reduction of the frame rate is not limited to the above example, and may be any manner in which the rate of setting of the skip macroblock decreases with increase in the degree of interest. For example, the interframe-compression condition may determine the rate of setting of the skip macroblock only in a part (i.e., not all) of the macroblocks in each of a part of frames, instead of the rate of setting of the skip macroblock in all the macroblocks in each of a part of frames. In the case where the skip macroblock is set in a part of the macroblocks (instead of all the macroblocks) in each of a part of frames, the compression ratio can be increased by finely reducing the frame rate, compared with the case where the frame rate is reduced on a frame-by-frame basis.

Alternatively, reduction of the frame rate can be realized by lowering of the frame update rate of the screen, for example, as follows. In this example, the interframe-compression condition stored in the interframe-compression-condition storage 242 determines, in advance, the frame rates of the region-of-interest videos 450, 440, 430, and 420 (in which the image quality is reduced) relative to the frame rate of the picked-up video image to be 1, ½, ¼, and ⅛ according to the degrees of interest, respectively. Then, the interframe compression unit 241 generates the region-of-interest video 420 (corresponding to the background region) having the frame rate of 2 fps (which is one-eighth of the frame rate before the interframe compression) by thinning out the region-of-interest video 420 before the image quality reduction. Similarly, the interframe compression unit 241 generates the region-of-interest video 430 (corresponding to the motion region) with the frame rate of 4 fps, the region-of-interest video 440 (corresponding to the human body region) with the frame rate of 8 fps, and the region-of-interest video 450 (corresponding to the human head region) with the frame rate of 16 fps.

In the image encoding apparatus 120-3 according to the third embodiment, it is possible to prevent excessive lowering of the frame rate in one or more regions of interest in which the frame rate is not to be reduced, and greatly reduce the frame rate in one or more regions of interest in which the frame rate can be reduced. Therefore, it is possible to effectively reduce the frame rate according to the degree of interest in each region of interest while maintaining the sharpness equal to or higher than the target sharpness according to the degree of interest, reduce the calculation burden of the compression processing, and achieve high compression of the video image.

4. Fourth Embodiment 4.1 Functions of Fourth Embodiment

Figure 13:
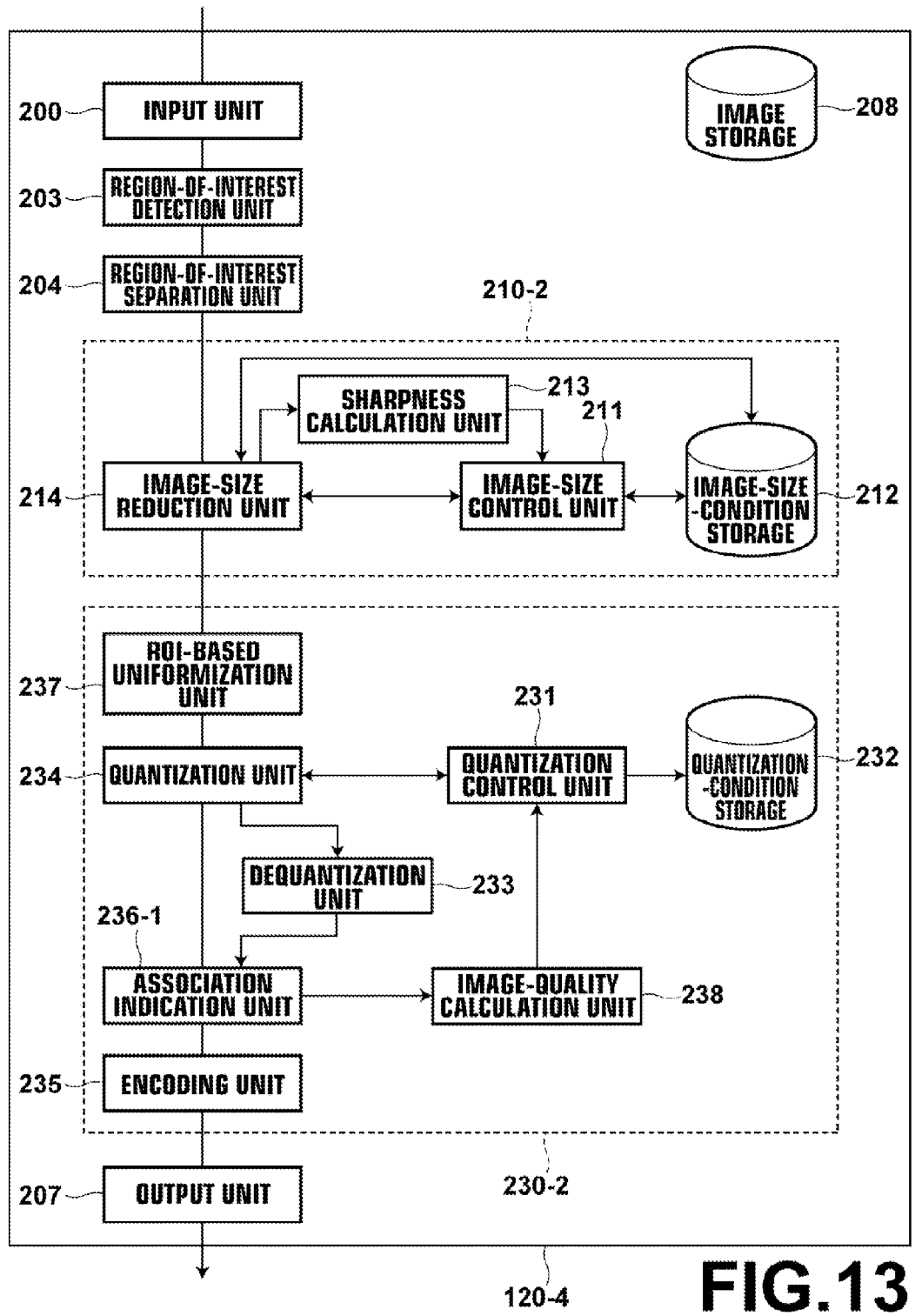
FIG. 13 is a block diagram illustrating functions of an image encoding apparatus 120-4 according to a fourth embodiment of the present invention.

FIG. 13 is a block diagram illustrating functions of an image encoding apparatus 120-4 according to the fourth embodiment, which can be used as one of the image encoding apparatuses 120a, 120b, and 120c in the configuration of the image processing system 10 illustrated in FIG. 1.

As illustrated in FIG. 13, the image encoding apparatus 120-4 according to the fourth embodiment comprises a quantization control unit 231, which differentiates the manner of quantization of ROI-based reduced images (reduced images of the region-of-interest images) according to the image sizes of the reduced, ROI-based reduced images.

In addition, the image encoding apparatus 120-4 comprises a dequantization unit 233 and an image-quality calculation unit 238 as well as the quantization-condition storage 232 (which stores the quantization condition) and the quantization unit 234 (which quantizes the reduced images on the basis of the quantization condition). The dequantization unit 233 dequantizes the plurality of ROI-based reduced images quantized by the quantization unit 234, and the image-quality calculation unit 238 calculates the image quality of each of the plurality of ROI-based reduced images obtained by dequantization by the dequantization unit 233.

The quantization control unit 231 is realized mainly by the CPU 307, and differentiates the manners of quantization of the plurality of ROI-based reduced images respectively according to the image sizes of the plurality of ROI-based reduced images. Specifically, the quantization control unit 231 differentiates the quantization conditions respectively according to image sizes of the plurality of ROI-based reduced images, where the quantization conditions determine the compression ratios realized by the quantization. Further specifically, the quantization control unit 231 determines, according to the image sizes of the plurality of ROI-based reduced images, whether to quantize only one of the plurality of ROI-based reduced images by using a first set of different quantization conditions respectively corresponding to the plurality of regions of interest, or to quantize the plurality of ROI-based reduced images by using a second set of different quantization conditions respectively corresponding to the plurality of regions of interest, where the different quantization conditions in each of the first and second sets determine the compression ratios in quantization of the portions, respectively corresponding to the plurality of regions of interest, of the one or each of the plurality of ROI-based reduced images.

That is, the quantization control unit 231 compares the image sizes of the plurality of ROI-based reduced images, makes the quantization unit 234 quantize only one of the plurality of ROI-based reduced images by using the first set of different quantization conditions respectively corresponding to the plurality of regions of interest in the case where all of the image sizes of the plurality of ROI-based reduced images are identical, and makes the quantization unit 234 quantize the plurality of ROI-based reduced images by using a second set of different quantization conditions respectively corresponding to the plurality of regions of interest in the case where the image sizes of the plurality of ROI-based reduced images are not all identical.

Similarly to the first embodiment, the quantization-condition storage 232 stores a quantization condition, which includes a predetermined target value of an image quality index and a quantization parameter Qp which is set for each of the plurality of regions of interest. The quantization unit 234 quantizes one or more ROI-based reduced images on the basis of the quantization condition stored in the quantization-condition storage 232. The quantization control unit 231 makes the quantization unit 234 repeat the operation of changing the quantization parameters and making the quantization unit 234 quantize each of the plurality of ROI-based reduced images on the basis of the changed quantization parameters until a calculated value of the image quality index of the ROI-based reduced image reaches the predetermined target value of the image quality index.

4.2 Quantization Condition

FIG. 14 is a diagram illustrating examples of quantization conditions according to the fourth embodiment. As indicated in FIG. 14, a target value NO of the image quality index and quantization parameters $Qp_A$, $Qp_B$, $Qp_C$, and $Qp_D$ for the region of interest (human head region) 51A, the region of interest (human body region) 51B, the region of interest (motion region) 51C, and the region of interest (background region) 51D are set in the quantization conditions 72. The image quality index is a linear sum of a block noise amount and an edge amount, and the target value is a predetermined threshold. Alternatively, the target value $N_O$ of the image quality index may be defined as a weighted average of a predetermined threshold of the block noise amount and a predetermined threshold of the edge amount. The quantization parameters $Qp_A$, $Qp_B$, $Qp_C$, and $Qp_D$ are set so that the compression ratios decrease with increase in the degrees of interest. Therefore, in the above example, the compression ratios of the regions of interest 51A, 51B, 51C, and 51D respectively realized by the quantization parameters $Qp_A$ $Qp_B$, $Qp_C$, and $Qp_D$ increase in this order in correspondence with decrease in the degrees of interest.

The image quality index may be any index indicating the image quality. For example, the image quality index may be defined by the sharpness, the signal-to-noise ratio, the block noise amount, a linear sum of the block noise amount and the edge amount, or an appropriately provided formula. The present inventor and colleagues of the present inventor have found that the block noise, which is likely to appear when images having low sharpness undergo quantization with a high compression ratio, can be effectively suppressed in the case where the target image quality is set by a predetermined threshold of a linear sum of the block noise amount and the edge amount. Since, according to the fourth embodiment, the quantization can be performed within the range satisfying the predetermined threshold of the linear sum of the block noise amount and the edge amount, the image quality can be maintained at a high level even after compression is performed.

In addition, the quantization condition may be any condition for controlling the compression ratio in the quantization, and may include, for example, the macroblock size, where the quantization is performed for each macroblock.

The dequantization unit 233 is realized mainly by the CPU 307, and acquires and dequantizes the quantized, ROI-based reduced images, which are obtained by the quantization unit 234.

The association indication unit 236-1 expands the dequantized, ROI-based reduced images to identical sizes and combines the dequantized, ROI-based reduced images so as to generate a single continuously dequantized, expanded, and combined image, and supplies the dequantized, expanded, and combined image to the image-quality calculation unit 238. In addition, similarly to the association indication unit 236 in the second embodiment, the association indication unit 236-1 in the fourth embodiment also has the function of attaching to the quantized, ROI-based reduced images information (e.g., tag information) indicating the association between the quantized, ROI-based reduced images.

The image-quality calculation unit 238 is realized mainly by the CPU 307, acquires the dequantized, ROI-based reduced images from the dequantization unit 233 from the association indication unit 236-1, and calculates the image quality of the acquired image. Specifically, according to the fourth embodiment, the image-quality calculation unit 238 calculates a block noise amount and an edge amount, and then calculates a linear sum of the block noise amount and the edge amount as the value N of the image quality index.

According to the fourth embodiment, the interpixel differences across the boundaries between the macroblocks in both of the horizontal and vertical directions are obtained, and an average of the interpixel differences across the boundaries between the macroblocks. As explained before, the block noise amount can be defined in various manners as long as the block noise amount is a numerical value which quantitatively indicates the block noise. In this example, the edge amount is obtained as a sum of the pixel values of an edge image generated by the Sobel edge extraction, i.e., transformation of the objective images by application of a Sobel operator. As explained before, the edge amount can be defined in various manners as long as the edge amount is a numerical value representing the amount of edges. The image quality is lowered with increase in the linear sum of the block noise amount and the edge amount, and is raised with decrease in the linear sum.

4.3 Processing Sequence in Fourth Embodiment

Figure 15A:
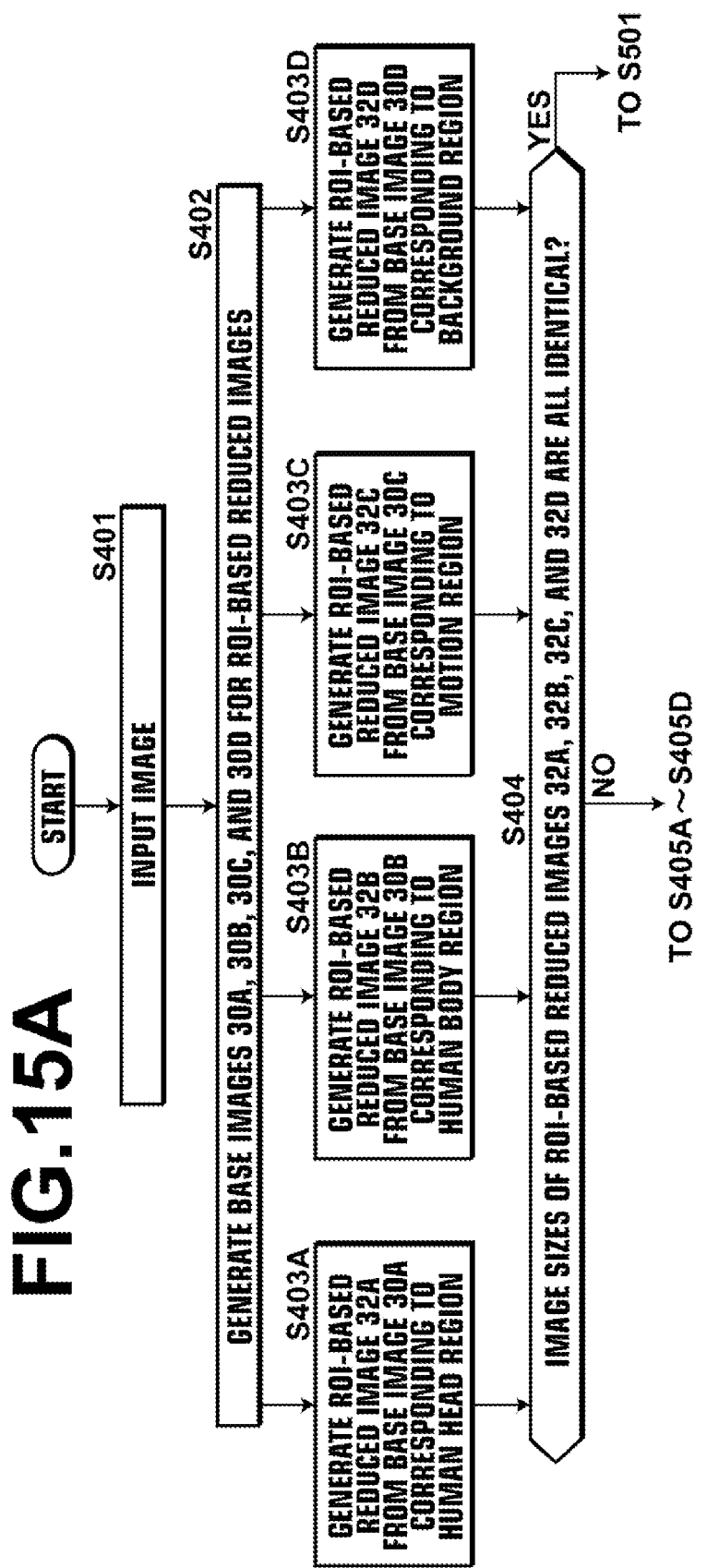

A sequence of processing performed in an image encoding apparatus according to the fourth embodiment is explained below with reference to FIGS. 15A, 15B, and 15C, which are flow diagrams illustrating the sequence of processing performed in the image encoding apparatus according to the fourth embodiment.

In step S401 (in FIG. 15A), the input unit 200 acquires an inputted image 30.

In step S402 (in FIG. 15A), the region-of-interest detection unit 203 detects from the inputted image 30 separate regions of interest 51A, 51B, 51C, and 51D, which respectively include a human head region, a human body region, a motion region, and a background region. Then, the region-of-interest separation unit 204 generates base images 30A, 30B, 30C, and 30D for reduced images (ROI-based reduced images) 32A, 32B, 32C, and 32D corresponding to the regions of interest 51A, 51B, 51C, and 51D, respectively, by duplicating the inputted image 30.

In steps S403A, S403B, S403C, and S403D (in FIG. 15A), the image-size control unit 211 generates the ROI-based reduced images 32A, 32B, 32C, and 32D having the reduced image sizes satisfying the target degrees $S_{30A}$, $S_{30B}$, $S_{30C}$, and $S_{30D}$ of the sharpness (respectively corresponding to the base images 30A, 30B, 30C, and 30D), respectively, by repeating the operations similar to steps S102 to S105 (indicated in FIG. 3 for the first embodiment) in a similar manner to the operations in step S303A, S303B, S303C, and S3030.

In step S404 (in FIG. 15A), the quantization control unit 231 compares the image sizes of the ROI-based reduced images 32A, 32B, 32C, and 32D. When the image sizes of the plurality of ROI-based reduced images 32A; 32B, 32C, and 32D are not all identical, i.e., when no is determined in step S404, the operation goes to steps S405A, S405B, S405C, and S405D (in FIG. 15B), and the quantization control unit 231 makes the ROI-based uniformization unit 237 partially uniformizes the ROI-based reduced images 32A, 32B, 32C, and 32D, so that partially uniformized, ROI-based reduced images 33A, 33B, 33C, and 33D are generated as in the second embodiment.

Thereafter, in step S406A, S406B, S406C, and S406D (in FIG. 15B), the quantization control unit 231 makes the quantization unit 234 quantize the partially uniformized, ROI-based reduced images 33A, 33B, 33C, and 33D. Specifically, the quantization unit 234 performs DCT (discrete cosine transformation) of the partially uniformized, ROI-based reduced images 33A, 33B, 33C, and 33D, so that DCT-transformed images (which may be hereinafter referred to as DCT images) 34A, 34B, 34C, and 34D are obtained.

In steps S407A, S407B, S407C, and S407D, the quantization unit 234 quantizes the DCT images 34A, 34B, 34C, and 34D by using the quantization parameters $Qp_A$, $Qp_B$, $Qp_C$, and $Qp_D$ corresponding to the regions of interest 51A, 51B, 51C, and 51D, respectively, in such a manner that the quantization is performed on all the macroblocks in the ROI-based reduced images 32A, 32B, 32C, and 32D. Thus, quantized, ROI-based reduced images 35A, 35B, 35C, and 35D are obtained.

In steps S408A, S408B, S408C, and S408D, the dequantization unit 233 dequantizes the quantized, ROI-based reduced images 35A, 35B, 35C, and 35D, so that dequantized, ROI-based reduced images 36A, 36B, 36C, and 36D are obtained.

In step S409, the association indication unit 236-1 expands the dequantized, ROI-based reduced images to identical sizes and combines the dequantized, ROI-based reduced images so as to generate a single continuously dequantized, expanded, and combined image 36. In addition, the association indication unit 236-1 attaches to the quantized, ROI-based reduced images 35A, 35B, 35C, and 35D information (e.g., tag information) indicating the association between the quantized, ROI-based reduced images 35A, 35B, 35C, and 35D.

In step S410, the image-quality calculation unit 238 calculates the block noise amount and the edge amount of the dequantized, expanded, and combined image 36, and then calculates the linear sum of the block noise amount and the edge amount as the value N of the image quality index.

In step S411, the quantization control unit 231 compares the value N of the image quality index calculated for the dequantized, expanded, and combined image 36 with the target value NO. When the value N of the image quality index calculated for the dequantized, expanded, and combined image 36 is smaller than the target value NO, i.e., when yes is determined in step S411, the calculated image quality is higher than the target image quality. Therefore, the operation goes to step S414. In step S414, the quantization control unit 231 increases each of the quantization parameters $Qp_A$, $Qp_B$, $Qp_C$, and $Qp_D$ in order to increase the compression ratio, and then repeats the operations in steps S407A, S407B, S407C, and S407D to S411. During this repetition, the quantized, ROI-based reduced images 35A, 35B, 35C, and 35D which are obtained in the preceding repetition cycle are reserved.

In this example, all of the quantization parameters $Qp_A$, $Qp_B$, $Qp_C$, and $Qp_D$ are increased by a predetermined ratio in step S411. However, the quantization parameters $Qp_A$, $Qp_B$, $Qp_C$, and $Qp_D$ may be increased in a different manner in step S411. For example, it is possible to increase only a part of the quantization parameters $Qp_A$, $Qp_B$, $Qp_C$, and $Qp_D$, increase the quantization parameters $Qp_A$, $Qp_B$, $Qp_C$, and $Qp_D$ at various rates, or increase each of all or a part of the quantization parameters $Qp_A$, $Qp_B$, $Qp_C$, and $Qp_D$ at various rates.

When no is determined in step S411, and the value N of the image quality index calculated for the dequantized, expanded, and combined image 36 is greater than the target value NO, the calculated image quality is lower than the target image quality. Therefore, the operation goes to step S412. In this case, in step S412, the encoding unit 235 encodes the quantized, ROI-based reduced images 35A, 35B, 35C, and 35D which are obtained in the preceding repetition cycle in the loops of steps S407A, S407B, S407C, and S407D to S411 and S414, so that the encoded, ROI-based reduced images 37A, 37B, 37C, and 37D are obtained from the quantized, ROI-based reduced images 35A, 35B, 35C, and 35D which are obtained in the preceding repetition cycle. In step S412, the information (e.g., tag information) being added to the quantized, ROI-based reduced images 35A, 35B, 35C, and 35D and indicating the association between the quantized, ROI-based reduced images 35A, 35B, 35C, and 35D is also encoded together with the quantized, ROI-based reduced images 35A, 35B, 35C, and 35D.

When no is determined in step S411, and the value N of the image quality index calculated for the dequantized, expanded, and combined image 36 is equal to the target value NO, the calculated image quality is equal to the target image quality. Therefore, the operation also goes to step S412. In this case, in step S412, the encoding unit 235 encodes the quantized, ROI-based reduced images 35A, 35B, 35C, and 35D which are obtained in the current cycle in the loops of steps S407A, S407B, S407C, and S407D to S411 and S414, so that the encoded, ROI-based reduced images 37A, 37B, 37C, and 37D are generated from the quantized, ROI-based reduced images 35A, 35B, 35C, and 35D which are obtained in the current cycle. In step S412, the information (e.g., tag information) being added to the quantized, ROI-based reduced images 35A, 35B, 35C, and 35D and indicating the association between the quantized, ROI-based reduced images 35A, 35B, 35C, and 35D is also encoded together with the quantized, ROI-based reduced images 35A, 35B, 35C, and 35D.

Thus, before the encoding, in steps S407A, S407B, S407C, and S407D to S411 and S414, the quantized, ROI-based reduced images 35A, 35B, 35C, and 35D are compressed with the greatest compression ratio within the range in which the value N of the image quality index calculated for the dequantized, expanded, and combined image 36 does not exceed the target value NO. In addition, since the calculation of the value of the image quality index (as the linear sum of the block noise amount and the edge amount) is performed on the single continuously dequantized, expanded, and combined image 36 composed of the dequantized, ROI-based reduced images, the calculated result includes the block noise occurring at the boundaries between the dequantized, ROI-based reduced images in the dequantized, expanded, and combined image 36. Therefore, it is possible to more accurately increase the compression ratio in the quantization while maintaining the linear sum of the block noise amount and the edge amount within the range determined by the target value for the linear sum.

In step S413, the output unit 207 transmits to the communication network 110 the video data including the data of the plurality of encoded, ROI-based reduced images 37A, 37B, 37C, and 37D.

When the image sizes of the plurality of ROI-based reduced images 32A, 32B, 32C, and 32D are all identical, i.e., when yes is determined in step S404 (in FIG. 15A), the operation goes to step S501 (in FIG. 15C), and the quantization control unit 231 makes the quantization unit 234 quantize only the ROI-based reduced image 32A. That is, in step S501, the quantization unit 234 performs DCT (discrete cosine transformation) of the ROI-based reduced images 32A, so that a DCT-transformed image (which may be hereinafter referred to as a DCT image) 34A is generated. Then, in step S502, the quantization unit 234 quantizes the portions, corresponding to the regions of interest, of the DCT image 34A by using the corresponding quantization parameters $Qp_A$, $Qp_B$, $Qp_C$, and $Qp_D$, respectively. Specifically, the quantization unit 234 performs the quantization on each macroblock in the DOT image 34A by using one of the quantization parameters $Qp_A$, $Qp_B$, $Qp_C$, and $Qp_D$ for the region of interest containing the macroblock. That is, the quantization unit 234 quantizes the portion of the DCT image 34A corresponding to each macroblock contained in the region of interest 51A by using the quantization parameter $Qp_A$, the portion of the DCT image 34B corresponding to each macroblock contained in the region of interest 51B by using the quantization parameter $Qp_B$, the portion of the DCT image 34C corresponding to each macroblock contained in the region of interest 51C by using the quantization parameter $Qp_C$, and the portion of the DCT image 34D corresponding to each macroblock contained in the region of interest 51D by using the quantization parameter $Qp_D$. Thus, a quantized, ROI-based reduced image 35A is obtained.

In order to maintain the sharpness of the region of the highest interest to the greatest possible extent even in the compressed image in the case where compressed data for use is generated on the basis of only one ROI-based reduced image, it is preferable to generate the compressed data for use on the basis of the ROI-based reduced image satisfying the highest target degree of sharpness (i.e., being reduced so as to satisfy the highest target degree of sharpness). Therefore, according to the fourth embodiment, the compressed data for use is generated on the basis of only one ROI-based reduced image 32A. However, the compressed data for use may be generated by using a ROI-based reduced image other than the ROI-based reduced image satisfying the highest target degree of sharpness.

In step S503, the dequantization unit 233 generates a dequantized, ROI-based reduced image 36A by dequantizing the quantized, ROI-based reduced image 35A.

In step S504, the image-quality calculation unit 238 calculates a block noise amount and an edge amount of the dequantized, ROI-based reduced image 36A, and then calculates a linear sum of the block noise amount and the edge amount as a value N of the image quality index.

In step S505, the quantization control unit 231 compares the value N of the image quality index calculated for the dequantized, ROI-based reduced image 36A in step S504 with the target value NO. When the value N of the image quality index calculated for the dequantized, ROI-based reduced image 36A is smaller than the target value NO, i.e., when yes is determined in step S505, the calculated image quality is higher than the target image quality. Therefore, the operation goes to step S506. In step S506, the quantization control unit 231 increases the quantization parameters $Qp_A$, $Qp_B$, $Qp_C$, and $Qp_D$ in order to increase the compression ratio, and then repeats the operations in steps S502 to S505. During this repetition, the quantized, ROI-based reduced image 35A which is obtained in the preceding repetition cycle are reserved.

In the fourth embodiment, the same quantization parameters $Qp_A$, $Qp_B$, $Qp_C$, and $Qp_D$ are used in both of the case where the compressed data for use is generated on the basis of only one ROI-based reduced image and the case where the compressed data for use is generated on the basis of the plurality of ROI-based reduced images. However, the set of quantization parameters $Qp_A$, $Qp_B$, $Qp_C$, and $Qp_D$ for use in the case where the compressed data for use is generated on the basis of only one ROI-based reduced image may be differentiated from the set of quantization parameters $Qp_A$, $Qp_B$, $Qp_C$, and $Qp_D$ for use in the case where the compressed data for use is generated on the basis of the plurality of ROI-based reduced images.

When no is determined in step S505, and the value N of the image quality index calculated for the dequantized, ROI-based reduced image 36A in step S504 is greater than the target value NO, the calculated image quality is lower than the target image quality. Therefore, the operation goes to step S507. In this case, in step S507, the encoding unit 235 encodes the quantized, ROI-based reduced image 35A which is obtained in the preceding repetition cycle in the loops of steps S502 to S505 and S506, so that the encoded, ROI-based reduced images 37A is generated from the quantized, ROI-based reduced image 35A which is obtained in the preceding repetition cycle.

When no is determined in step S505, and the calculated value N of the image quality index calculated for the dequantized, ROI-based reduced image 36A is equal to the target value NO, the calculated image quality is equal to the target image quality. Therefore, the operation also goes to step S507. In this case, in step S507, the encoding unit 235 encodes the quantized, ROI-based reduced image 35A which is obtained in the current cycle in the loops of steps S502 to S505 and S506, so that the encoded, ROI-based reduced image 37A is generated from the quantized, ROT-based reduced image 35A which is obtained in the current cycle.

Thus, before the encoding, in steps S502 to S505 and S506, the quantized, ROI-based reduced image 35A is compressed with the greatest compression ratio within the range in which the calculated value N of the image quality index does not exceed the target value NO.

In step S508, the output unit 207 transmits to the communication network 110 the video data including the data of the plurality of region-of-interest video images.

4.4 Advantages of Fourth Embodiment

The advantages of the fourth embodiment are explained below.

(1) As explained above, the image encoding apparatus 120-4 according to the fourth embodiment has the quantization control unit 231, which differentiates the manners of quantization for each region of interest, according to the image sizes of the plurality of ROI-based reduced images. Thus, different manners of quantization realizing different compression ratios can be used according to the image sizes of the ROI-based reduced image, so that the image quality can be preferably maintained even after compression is performed.

(2) As explained before, the quantization control unit 231 determines, according to the image sizes of the plurality of ROI-based reduced images, whether to quantize only one of the plurality of ROI-based reduced images by using the first set of different quantization conditions respectively corresponding to the plurality of regions of interest, or to quantize the plurality of ROI-based reduced images by using the second set of different quantization conditions respectively corresponding to the plurality of regions of interest, where the different quantization conditions in each of the first and second sets determine the compression ratios in quantization of the portions, respectively corresponding to the plurality of regions of interest, of the one or each of the plurality of ROI-based reduced images. Therefore, different manners of quantization realizing different compression ratios can be used according to the image sizes of the ROI-based reduced image, so that the image quality can be preferably maintained even after compression is performed.

(3) In the case where the sharpness of the inputted image is low, the compression realized by quantization of only one ROI-based reduced image produces conspicuous block noise. However, the block noise can be suppressed by performing compression by separately quantizing the plurality of ROI-based reduced images respectively having different image sizes.

In the case where the compression is performed by separately quantizing the plurality of ROI-based reduced images respectively having different image sizes, the extent of the minimum unit area of the quantization is different in each ROI-based reduced image. In the image encoding apparatus 120-4 according to the fourth embodiment, the dequantized, expanded, and combined image is obtained by expanding the dequantized, ROI-based reduced images to identical sizes and combining the dequantized, ROI-based reduced images. Therefore, it is possible to suppress block noise which can occur at the boundaries between the macroblocks constituting each region of interest and the macroblocks constituting other regions of interest after expanding and combining of the dequantized, ROI-based reduced images.

In the case where compression is performed by quantization of only one of the ROI-based reduced images respectively having different image sizes, it is possible to maintain the image quality even after the compression without increasing the calculation burden. In particular, in the case where the sharpness of the inputted image is high, an image which is sufficiently sharp even after compression can be obtained by performing the compression by quantization of only one of the ROI-based reduced images. Therefore, according to the image sizes of the ROI-based reduced images, the image quality can be maintained without unnecessarily increasing the calculation burden.

In summary, the image encoding apparatus 120-4 according to the fourth embodiment can suppress the block noise by separately quantizing the plurality of ROI-based reduced images in which the image sizes are differentiated. In addition, in the case where the image sizes of the ROI-based reduced images are all identical, the image encoding apparatus 120-4 according to the fourth embodiment performs compression by quantizing only one of the ROI-based reduced images, so that excessive increase in the calculation burden can be suppressed.

(4) In the image encoding apparatus 120-4 according to the fourth embodiment, the quantization control unit 231 compares the image sizes of the plurality of ROI-based reduced images. When all of the image sizes of the plurality of ROI-based reduced images are identical, the quantization control unit 231 makes the quantization unit 234 quantize only one of the plurality of ROI-based reduced images by using the first set of different quantization conditions respectively corresponding to the plurality of regions of interest, where the different quantization conditions in the first set determine the compression ratios in quantization of the portions, respectively corresponding to the plurality of regions of interest, of the one of the plurality of ROI-based reduced images. When the image sizes of the plurality of ROI-based reduced images are not all identical, the quantization control unit 231 makes the quantization unit 234 quantize the plurality of ROI-based reduced images by using the second set of different quantization conditions respectively corresponding to the plurality of regions of interest, where the different quantization conditions in the second set determine the compression ratios in quantization of the portions, respectively corresponding to the plurality of regions of interest, of each of the plurality of ROI-based reduced images. Therefore, different manners of quantization which realize different compression ratios can be used according to the image sizes of the ROI-based reduced image, so that the image quality can be preferably maintained even after compression is performed.

(5) In the image encoding apparatus 120-4 according to the fourth embodiment, the quantization control unit 231 makes the quantization unit 234 repeat the operation of changing the quantization parameters and making the quantization unit 234 quantize the plurality of ROI-based reduced images on the basis of the changed quantization parameters until the calculated value of the image quality index of the dequantized, ROI-based reduced images reaches the predetermined target value of the image quality index. Therefore, the quantization can be performed by using the quantization parameters realizing high compression ratios within the range in which the target image quality is satisfied, so that it is possible to achieve high compression of the image while maintaining the image quality even after compression.

(6) In the image encoding apparatus 120-4 according to the fourth embodiment, the target image quality is a predetermined threshold of a linear sum of the block noise amount and the edge amount. In this case, quantization can be performed by using quantization parameters realizing high compression ratios within the range in which the target image quality is satisfied. That is, the image can be compressed with high compression ratios while the block noise in the image after the compression is suppressed within a predetermined range. In addition, the evaluation of the image quality based on the linear sum of the block noise amount and the edge amount is preferable in consideration of the aforementioned finding by the present inventor and colleagues of the present inventor that the block noise (which is likely to appear when images having low sharpness undergo quantization realizing a high compression ratio) can be effectively suppressed in the case where the target image quality is set by a predetermined threshold of a linear sum of the block noise amount and the edge amount.

(7) Further, in the case where the image processing apparatus 170 in the image processing system 10 has a function of performing the super-resolution processing on the constituent frames of the video data outputted from the image encoding apparatus 120-4 according to the fourth embodiment, the image processing system 10 can produce video data being compressed with high compression ratios and having higher sharpness.

4.5 Variation of Fourth Embodiment

In the above explanations of the fourth embodiment, it is assumed that the block noise amount is calculated and evaluated on an image-by-image basis. However, the manner of the calculation and evaluation of the block noise amount is not limited to the manner explained above, and the block noise amount may be calculated and evaluated on an macroblock-by-macroblock basis. For example, as mentioned before, the block noise amount can be defined by the flatness of macroblocks and the discontinuity between adjacent macroblocks.

A variation of the fourth embodiment is explained below. In the variation of the fourth embodiment, both of the block noise amount and the edge amount are evaluated on a macroblock-by-macroblock basis.

First, the variance and the average of the pixel values in each macroblock constituting a frame are calculated. Then, it is determined whether or not the variance of the pixel values in each macroblock is equal to or smaller than a threshold, and one or more macroblocks in which the variance of the pixel values is equal to or smaller than the threshold are extracted. Thereafter, the block noise amount is evaluated for each of the one or more extracted macroblocks as follows. First, one or more of the macroblocks which are located adjacent, in the horizontal or vertical directions, to each of the one or more extracted macroblocks to be evaluated and in which the variance of the pixel values is equal to or smaller than the threshold are extracted. Then, the sum of the absolute values of the differences between the average of the pixel values in the macroblock to be evaluated and the averages of the pixel values in the one or more adjacent macroblocks extracted as above is determined to be the block noise amount N. Since each of the macroblock to be evaluated and the one or more adjacent macroblocks extracted as above possibly has a flat distribution of pixel values, block noise can appear between the macroblock to be evaluated and each of the one or more adjacent macroblocks extracted as above, and the difference between the average of the pixel values in the macroblock to be evaluated and the averages of the pixel values in the one or more adjacent macroblocks extracted as above can be considered to represent the degree of block noise between the macroblock to be evaluated and the one or more adjacent macroblocks extracted as above.

The edge amount may be defined, for example, as the sum of the pixel values in each macroblock to be evaluated in which edges are extracted by use of a Sobel operator. Since only the areas of edges are extracted in the image obtained by edge detection with the Sobel operator, the sum of the pixel values in the image obtained by use of the Sobel operator is the sum of the pixel values in the areas of edges. In the variation of the fourth embodiment, a threshold value of a linear sum of the block noise amount and the edge amount is defined as a target value NO of the image quality index, where the block noise amount is defined for each macroblock. In the case where the block noise amount is defined for each macroblock, it is preferable that the edge amount be also defined for each macroblock.

Figure 17:
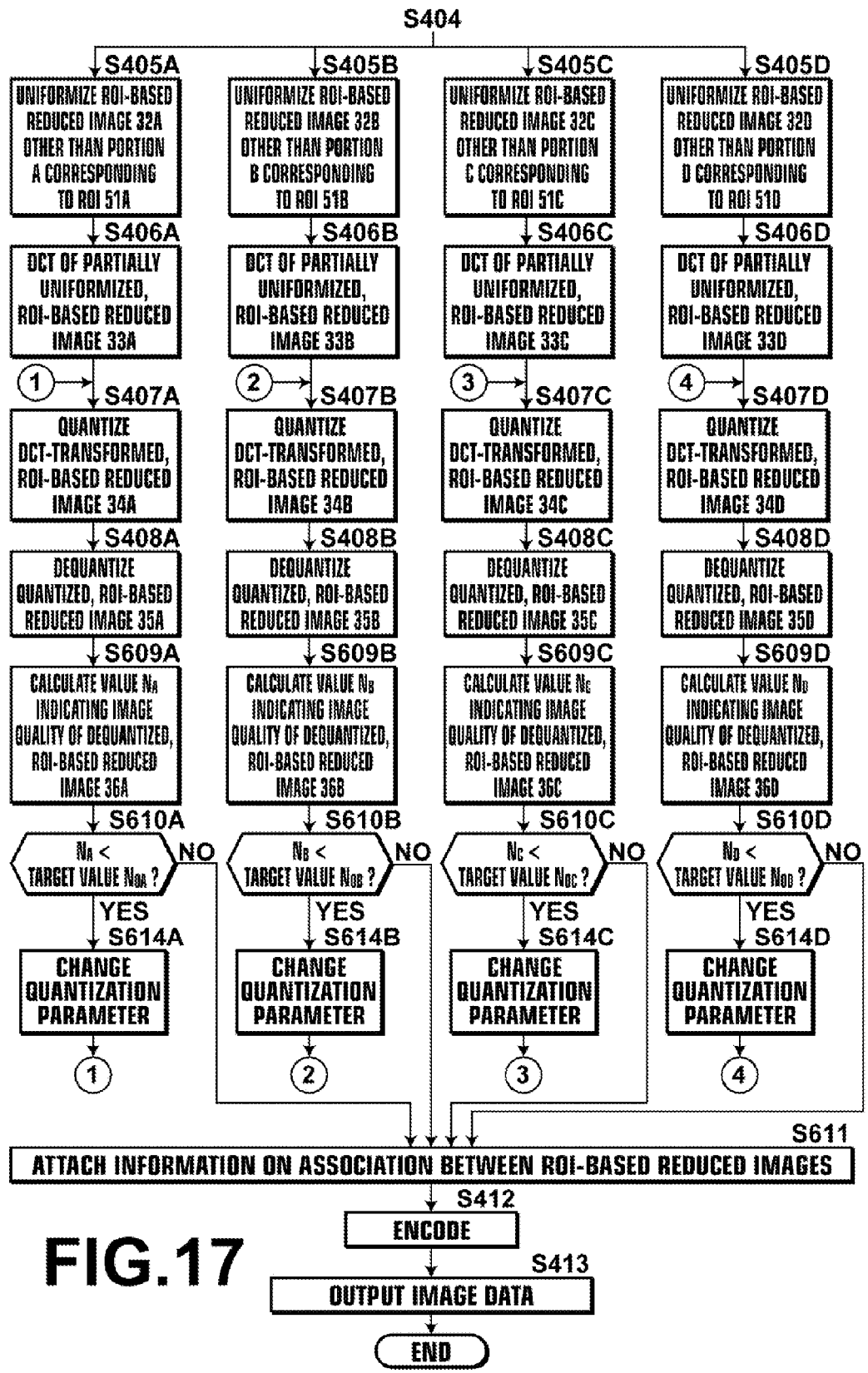
FIG. 17 is a flow diagram illustrating a substitution for the part of the sequence indicated in FIG. 15B, which is performed in the variation of the fourth embodiment.

FIG. 16 indicates examples of quantization conditions which are according to the variation of the fourth embodiment. The quantization conditions 73 indicated in FIG. 16 are different from the quantization conditions 72 indicated in FIG. 14 in that the quantization conditions 73 include target values $N_{OA}$, $N_{OB}$, $N_{OC}$, and $N_{OD}$ of the linear sum of the block noise amount and the edge amount are set for the regions of interest 51A, 51B, 51C, and 51D, respectively. In addition, FIG. 17 is a flow diagram illustrating a substitution for the part of the sequence indicated in FIG. 15B, which is performed in the variation of the fourth embodiment. The sequence of processing performed in the image encoding apparatus according to the variation of the fourth embodiment, the part of which is indicated in FIG. 17, is different from the sequence of processing performed in the image encoding apparatus according to the fourth embodiment in the order of the operations insteps S609A, S609B, S609C, S609D, S610A, S610B, S610C, S610D, S614A, S614B, S614C, S614D, and S611, and all of the other operations in the sequence of processing performed in the variation of the fourth embodiment are the same as the sequence of processing performed in the fourth embodiment. Therefore, the explanations on the steps indicated in FIGS. 15A and 15C are not repeated.

In the example indicated in FIG. 15B, the operations of expanding and combining the dequantized, ROI-based reduced images so as to generate the single continuously dequantized, expanded, and combined image 36 and the operation of attaching to the quantized, ROI-based reduced images 35A, 35B, 35C, and 35D the information (e.g., tag information) indicating the association between the quantized, ROI-based reduced images 35A, 35B, 35C, and 35D (in step S409) are performed before the operation of calculating the value N of the image quality index (in step S410) and the operation of comparing the calculated value N of the image quality index with the target value NO (in step S411). On the other hand, in the sequence of processing performed in the image encoding apparatus according to the variation of the fourth embodiment, the part of which is indicated in FIG. 17, the operations of calculating the image quality (in steps S609A, S609B, S609C, and S609D), the operations of comparing the calculated image quality with target image quality (in steps S610A, S610B, S610C, and S610D), and the operations of changing the quantization parameters (in steps S614A, S614B, S614C, and S614D) are performed after the operations of dequantizing the quantized, reduced ROI-based reduced images 35A, 35B, 35C, and 35D (in steps S608A, S608B, S608C, and S608D) before the operation of attaching to the quantized, ROI-based reduced images 35A, 35B, 35C, and 35D information (e.g., tag information) indicating the association between the quantized, ROI-based reduced images 35A, 35B, 35C, and 35D (in step S611).

In the operations in steps S609A, S609B, S609C, and S609D, the image-quality calculation unit 238 calculates, for each macroblock in each of the dequantized, ROI-based reduced images 36A, 36B, 36C, and 36D, the block noise amount, the edge amount, and the linear sum of the block noise amount and the edge amount, so that the calculated values $N_A$, $N_B$, $N_C$, and $N_D$ of the linear sum of the block noise amount and the edge amount are obtained. In the operations in steps S610A, S610B, S610C, and S610D, for each macroblock in each of the dequantized, ROI-based reduced images 36A, 36B, 36C, and 36D, the quantization control unit 231 compares the calculated value of the linear sum of the block noise amount and the edge amount with the corresponding one of the target values $N_{OA}$, $N_{OB}$, $N_{OC}$, and $N_{OD}$ of the linear sum of the block noise amount and the edge amount.

When the value $N_A$ of the image quality index calculated for every macroblock in the dequantized image 36A is smaller than the target value $N_{OA}$, i.e., when yes is determined in step S610A for every macroblock in the dequantized image 36A, the calculated image quality is higher than the target image quality. Therefore, the operation goes to step S614A, and the quantization control unit 231 increases the quantization parameter $Qp_A$ in order to increase the compression ratio, and then repeats the operations in steps S407A, S408A, S609A, S610A, and S614A. During this repetition, the quantized, ROI-based reduced image 35A which is obtained in the preceding repetition cycle is reserved.

When the value $N_A$ of the image quality index calculated for at least one macroblock in the dequantized image 36A is greater than the target value $N_{OA}$, i.e., when no is determined in step S610A for at least one macroblock in the dequantized image 36A, the calculated image quality is lower than the target image quality. Therefore, the quantization control unit 231 passes to the association indication unit 236-1 the quantized, ROI-based reduced image 35A obtained in the preceding repetition cycle in the loops of steps S407A, S408A, S609A, S610A, and S614A. When no is determined in step S610A for at least one macroblock in the dequantized image 36A, and the value $N_{OA}$ of the image quality index calculated for at least one macroblock in the dequantized image 36A reaches the target value $N_{OA}$, the calculated image quality reaches the target image quality. Therefore, the quantization control unit 231 passes the quantized, ROI-based reduced images 35A, 35B, 35C, and 35D to the association indication unit 236-1.

In addition, operations similar to the operations in step S610A performed for the dequantized, ROI-based reduced image 36A are performed for each of the dequantized, ROI-based reduced images 36B, 36C, and 36D in the corresponding one of the steps S610B, S610C, and S610D, and operations similar to the operations in step S614A performed for the dequantized, ROI-based reduced image 36A are performed for each of the dequantized, ROI-based reduced images 36B, 36C, and 36D in the corresponding one of the steps S614B, S614C, and S614D.

In step S611, the association indication unit 236-1 attaches, to the quantized, ROI-based reduced images 35A, 35B, 35C, and 35D satisfying the target values $N_{OA}$, $N_{OB}$, $N_{OC}$, and $N_{OD}$ of the image quality index, information (e.g., tag information) indicating the association between the quantized, ROI-based reduced images 35A, 35B, 35C, and 35D.

As explained above, the image encoding apparatus according to the variation of the fourth embodiment can realize encoding with high compression ratios while satisfying the target image quality for each region of interest.

Further, in the variation of the fourth embodiment, it is possible to obtain, by a simulation or the like, a relationship between the values of the linear sum of the block noise amount and the edge amount in the respective ROI-based reduced images and the value of the linear sum of the block noise amount and the edge amount in a dequantized, expanded, and combined image generated by expanding and combining the ROI-based reduced images, provide a database which stores the above relationship, and determine the target values $N_{OA}$, $N_{OB}$, $N_{OC}$, and $N_{OD}$ of the linear sum of the block noise amount and the edge amount for the dequantized, ROI-based reduced images 36A, 36B, 36C, and 36D so that the linear sum of the block noise amount and the edge amount in the dequantized, expanded, and combined image generated by expanding and combining the dequantized, ROI-based reduced images 36A, 36B, 36C, and 36D fall within a desirable range. In this case, as in the fourth embodiment, it is possible to remarkably reduce the influence of the block noise amount in the image after compression.

5. Detection of Region of Interest

Hereinbelow, several manners for detecting the regions of interest by the region-of-interest detection unit 203 are explained.

The region-of-interest detection unit 203 detects, as different types of regions of interest, one or more regions each covering a human face, one or more regions each covering a human body, and one or more regions each covering a moving object. For example, the region-of-interest detection unit 203 performs pattern matching or the like so as to detect as a face region (as a region of interest) an object matching a predetermined pattern of the human face with a degree of match higher than a predetermined degree, and detect as a human-body region (as a region of interest) an object matching a predetermined pattern of the human body with a degree of match higher than a predetermined degree. Alternatively, the region-of-interest detection unit 203 may detect a human-body region from a region located in a vicinity of a face region.

In addition, the region-of-interest detection unit 203 identifies a region containing a moving object as a motion region on the basis of a plurality of frames. For example, the region-of-interest detection unit 203 identifies as a motion region a region in which an amount of change in the pixel values from another frame is greater than a predetermined value. Otherwise, the region-of-interest detection unit 203 may extract an object contained in each frame by edge extraction or the like. Then, the region-of-interest detection unit 203 may identify an object being contained in a different position in another frame and matching the extracted object with a degree of match higher than a predetermined degree, and detect as a motion region the region containing the identified object. The motion region detected by the region-of-interest detection unit 203 is a region containing an object or the like which moves across macroblocks, and the region-of-interest detection unit 203 does not as a motion region a region containing an object periodically moving in a very small specific macroblock such as a plant or tree swayed by wind.

As explained above, the region-of-interest detection unit 203 detects as a region of interest (ROI) a region conforming to a predetermined condition concerning the image data. Specifically, the region-of-interest detection unit 203 detects as an ROI a region conforming to a predetermined condition, for example, a region containing an object matching a predetermined shape with a degree of match higher than a predetermined degree. In addition, the region-of-interest detection unit 203 detects as an ROI a region in which an amount of change in the image is greater than a predetermined amount, for example, a region in which an amount of change in pixel values from another frame is greater than a predetermined amount.

Further, the region-of-interest detection unit 203 can detect as an ROI a region containing an image of a part of a human head, or an image of another part (e.g., a hand or the like) of a human body, or an image of at least a part of a living body other than the human bodies, where the living body includes specific tissue (such as tumor tissue or a blood vessel) existing inside a living body. Furthermore, the region-of-interest detection unit 203 can detect as an ROI a region containing an image of a coin, a card (such as a bank card), a vehicle, or a license plate of a vehicle.

Alternatively, each of the following techniques (1) to (6) can be used by the region-of-interest detection unit 203 for detect ROIs.

(1) The region-of-interest detection unit 203 can detect ROIs not only on the basis of pattern matching such as template matching and also on the basis of a result of learning by use of a machine learning algorithm (e.g., AdaBoost) as disclosed in U.S. Pat. No. 7,801,337. For example, the characteristic of an image feature quantity extracted from an image of a predetermined object may be learned by using the image feature quantity extracted from the image of the predetermined object and an image feature quantity extracted from one or more images of one or more objects other than the predetermined object, and the region-of-interest detection unit 203 may detect as an ROI a region in which an image feature quantity matching the learned characteristic is detected. Further, the ROIs detected by the region-of-interest detection unit 203 may have arbitrary shapes including a rectangular shape.

(2) The region-of-interest detection unit 203 may detect ROIs by the technique disclosed in Japanese Patent Application No. 2008-078641. For example, the region-of-interest detection unit 203 generates an image group including a picked-up image from which an object is to be detected and one or more thinned-out images by thinning out pixels in the picked-up image at the predetermined rate or stepwise thinning out the pixels in the picked-up image at a predetermined rate. First, the region-of-interest detection unit 203 calculates an evaluation value by applying a first filter to a first image, where the first image belongs to the above image group and is a relatively small one in the above image group. The first filter acts on a two-dimensional region in the first image, and generates the evaluation value, which indicates the probability of existence of a specific type of object in the region. The first filter may be a filter which belongs to a filter group containing a plurality of filters and acts on a relatively small region, where the plurality of filters in the filter group are respectively to be applied to a plurality of regions having different extents, and the numbers of pixels corresponding to the extents of the plurality of regions are differentiated by a predetermined ratio or are stepwise differentiated by the predetermined ratio. The region-of-interest detection unit 203 extracts from the first image a region in which the evaluation value exceeds a first predetermined threshold as a primary candidate region. Then, the region-of-interest detection unit 203 calculates an evaluation value by applying a second filter to a region corresponding to the primary candidate region in a second image, where the second image has the next greater number of pixels than the first image, and the extent of the region on which the second filter acts is next greater than the extent of the region on which the first filter acts. The region-of-interest detection unit 203 extracts from the second image as a secondary candidate region a region in which the evaluation value exceeds a second predetermined threshold.

According to the above technique disclosed in Japanese Patent Application No. 2008-078641, the region-of-interest detection unit 203 performs a plurality of operations of extracting a candidate region as above by applying a plurality of filters (capable of acting on regions having different extents) to the corresponding regions in the images in the image group in increasing order of the extents of the regions. In the above plurality of operations, each filter acting on a relatively small region is applied to a relatively small image, and each filter acting on a relatively great region is applied to a relatively great image. That is, the region-of-interest detection unit 203 detects a specific type of object by performing two or more operations of extracting a candidate region and obtaining a finally extracted candidate region. Thus, the region-of-interest detection unit 203 detects as an ROI a region in which the specific type of object exists. As described above, in each of the one or more operations after the first operation, the filter is applied only to the region which is extracted in the immediately preceding operation. Therefore, the presence or absence of an object is determined through a plurality of operations of extraction, so that the ROI can be detected with relatively high accuracy. In addition, since the coarse screening for an ROI is performed on one or more smaller images, the ROI can be detected relatively quickly.

(3) The region-of-interest detection unit 203 may detect ROIs by the technique disclosed in Japanese Patent Application No. 2008-078636. For example, the region-of-interest detection unit 203 detects an ROI by using a plurality of filters which can act on a two-dimensional region having a predetermined extent in a picked-up image and calculate a plurality of feature quantities representing respectively different features of the contour and the inside of a specific type of object. Specifically, the region-of-interest detection unit 203 calculates the plurality of feature quantities by applying the plurality of filters to the region having the predetermined extent on the picked-up image, respectively. The plurality of filters are associated with the correspondence relationships between the plurality of feature quantities calculated by the plurality of filters and primary evaluation values, respectively, where each of the primary evaluation values indicates the probability of existence of the specific type of object in the above region. The region-of-interest detection unit 203 obtains a primary evaluation value corresponding to each of the calculated feature quantities on the basis of the correspondence relationships. Then, the region-of-interest detection unit 203 obtains a secondary evaluation value indicating the probability of existence of the specific type of object in the above region, by combining the plurality of primary evaluation values corresponding to the plurality of filters. Thereafter, the region-of-interest detection unit 203 compares the secondary evaluation value with a threshold, and extracts a region in which the probability of existence of the specific type of object is higher than the threshold. Thus, the region-of-interest detection unit 203 detects the above region as an ROI in which the specific type of object exists. As explained above, since a plurality of filters which extract a plurality of feature quantities representing various features of the contour and the inside of an object are combined, the region-of-interest detection unit 203 can detect an ROI with high accuracy, for example, compared with the extraction based on only the contour shape.

(4) The region-of-interest detection unit 203 can detect an ROI by combining the techniques disclosed in Japanese Patent Application Nos. 2008-078636 and 2008-078641. That is, the technique disclosed in Japanese Patent Application No. 2008-078636 is modified in such a manner that more than one filter respectively applied to a plurality of regions having different extents are provided for each feature quantity, where the numbers of pixels corresponding to the extents of the plurality of regions are differentiated by a predetermined ratio or are stepwise differentiated by the predetermined ratio. Each of the more than one filter may be associated with a correspondence relationship between the feature quantity calculated by the filter and a primary evaluation value. The region-of-interest detection unit 203 generates an image group including a picked-up image from which an object is to be detected and one or more thinned-out images by thinning out pixels in the picked-up image at the predetermined rate or stepwise thinning out the pixels in the picked-up image at the predetermined rate. Each filter acting on a relatively small region is applied to a relatively small image, and each filter acting on a relatively great region is applied to a relatively great image. Specifically, the region-of-interest detection unit 203 calculates a plurality of feature quantities by applying a plurality of first filters acting on relatively small regions to a first image (which is relatively small) in the image group. Then, the region-of-interest detection unit 203 obtains a primary evaluation value corresponding to each of the calculated feature quantities on the basis of the correspondence relationships associated with the plurality of first filters. After that, the region-of-interest detection unit 203 obtains a secondary evaluation value by combining the plurality of primary evaluation values, where the secondary evaluation value indicates the probability of existence of the specific type of object in the region to which the plurality of first filters are applied. Subsequently, the region-of-interest detection unit 203 compares the secondary evaluation value with a first threshold, and extracts as a primary candidate region a region in which the probability of existence of the specific type of object is higher than the first threshold. Thereafter, the region-of-interest detection unit 203 calculates a plurality of feature quantities by applying a plurality of second filters to a region corresponding to the primary candidate region in a second image, where the second image has the next greater number of pixels than the first image, and the extent of the region on which the second filter acts is next greater than the extent of the region on which the first filter acts. The region-of-interest detection unit 203 obtains a primary evaluation value corresponding to each of the calculated feature quantities on the basis of the correspondence relationship associated with one of the second filters. Then, the region-of-interest detection unit 203 obtains a secondary evaluation value indicating the probability of existence of the specific type of object in the region corresponding to the primary candidate region in the second image. Subsequently, the region-of-interest detection unit 203 compares the secondary evaluation value with a second threshold, and extracts a secondary candidate region in which the probability of existence of the specific type of object is higher than the second threshold.

According to the above technique in which the techniques disclosed in Japanese Patent Application Nos. 2008-078636 and 2008-078641 are combined, similarly to the technique disclosed in Japanese Patent Application No. 2008-078641, the region-of-interest detection unit 203 performs a plurality of operations of extracting a candidate region as above by applying a plurality of filters (capable of acting on regions having different extents) to the corresponding regions in the images in the image group in increasing order of the extents of the regions. In the above plurality of operations, each filter acting on a relatively small region is applied to a relatively small image, and each filter acting on a relatively great region is applied to a relatively great image. That is, the region-of-interest detection unit 203 detects a specific type of object by performing two or more operations of extracting a candidate region and obtaining a finally extracted candidate region. Thus, the region-of-interest detection unit 203 detects as an ROI a region in which the specific type of object exists. As described above, in each of the one or more operations subsequent to the first operation, the filter is applied only to the region which is extracted in the immediately preceding operation. Therefore, the presence or absence of an object is determined through a plurality of operations of extraction, so that the ROI can be detected with relatively high accuracy. In addition, since the coarse screening for an ROI is performed on one or more smaller images, the ROI can be detected relatively quickly.

(5) The region-of-interest detection unit 203 may detect ROIs by the technique disclosed in Japanese Patent Application No. 2008-098600. For example, the region-of-interest detection unit 203 detects an ROI from a plurality of picked-up images included in video images taken by a plurality of image pickup devices 100. Consider the case where the image pickup devices 100*a* and 100*b* respectively take video images of an identical scene. For example, the image pickup devices 100*a* and 100*b* can realize the function of a stereo camera. In the following explanations, the image picked up by the image pickup device 100*a* is referred to as the first picked-up image, the image picked up by the image pickup device 100*b* is referred to as the second picked-up image, and the first and second picked-up images are collectively referred to as an image pair. The region-of-interest detection unit 203 detects a specific type of object in the image pair, and detects as an ROI a region containing the detected object exists.

The region-of-interest detection unit 203 extracts a region containing an image of the specific type of object, from each of the first and second picked-up images in a pair. At this time, the region containing an image of the specific type of object may be detected by the region-of-interest detection unit 203 with low detection accuracy. Then, the region-of-interest detection unit 203 detects the specific type of object by detecting a pair of regions which are respectively contained in the first and second picked-up images and correspond to each other, from among one or more regions extracted from the first picked-up image and one or more regions extracted from the second picked-up image. For example, the region-of-interest detection unit 203 calculates the distance from the pair of regions to the object the images of which are detected in the pair of regions, so that the region-of-interest detection unit 203 can detect the specific type of object on the basis of the three-dimensional shape of the object, which is determined on the basis of the distance to the object.

In order to detect a pair of regions corresponding to each other, the region-of-interest detection unit 203 operates as follows. That is, the region-of-interest detection unit 203 determines a candidate pair of regions being detected from the first and second picked-up images in a pair likely to correspond to each other and containing an image of the specific type of object. Then, the region-of-interest detection unit 203 divides each region in the candidate pair into a plurality of subregions, and calculates a vector defined over the plurality of subregions and composed of the values of a feature quantity characterizing partial images of the specific type of object projected in the respective subregions in each region in the candidate pair. For example, the values of the feature quantity may be the pixel values in the plurality of subregions, and the vector defined over the plurality of subregions may be a gradient vector (e.g., a pixel-value gradient vector). Subsequently, the region-of-interest detection unit 203 calculates the logical distance between the vector calculated from the region in the first picked-up image and the vector calculated from the region in the second picked-up image. The region-of-interest detection unit 203 extracts the above candidate pair as a pair of regions corresponding to each other when the logical distance is smaller than a predetermined value. For example, the logical distance between two vectors may be defined as the square root of the sum of squares of the differences between the corresponding components of the two vectors. Since the region-of-interest detection unit 203 can extract the pair of regions corresponding to each other from the image pair with high accuracy, the region-of-interest detection unit 203 can calculate the distance to the object with high accuracy. Therefore, the region-of-interest detection unit 203 can recognize the three-dimensional shape of the object with high accuracy, and can therefore detect a specific type of object with high accuracy.

(6) Alternatively, the region-of-interest detection unit 203 may detect ROIs by the technique disclosed in Japanese Patent Application No. 2008-091562. For example, the region-of-interest detection unit 203 extracts, from each of a plurality of constituent frames contained in a video image, shapes having a similar appearance to a specific type of object together with information on the dimensions of each of the shapes and the position of each of the shapes in the field of view. The position of each of the shapes in the field of view may be the position in each constituent frame. The region-of-interest detection unit 203 determines whether or not the object having each of the extracted shapes corresponds to the specific type of object, and detects the specific type of object on the basis of the above determination. For example, the region-of-interest detection unit 203 may count the number of shapes having a similar appearance to the specific type of object extracted from a predetermined search area around one of the shapes having a similar appearance to the specific type of object in more than one frame and classified as having identical dimensions. When the number of shapes is equal to or greater than a threshold, it is possible to determine that the shapes having a similar appearance to the specific type of object correspond to the specific type of object. In this case, the region-of-interest detection unit 203 can detect a region containing the specific type of object as an ROI. Therefore, the region-of-interest detection unit 203 can detect, as images of the specific type of object, shapes having a similar appearance to the specific type of object and dimensions near predetermined dimensions and being concentratedly detected in the predetermined search area in more than one frame, so that the region-of-interest detection unit 203 is not required to detect shapes having a similar appearance to the specific type of object from areas other than the above predetermined search area in more than one frame. Thus, it is possible to reduce the possibility of detection, as an image of the specific type of object, a shape having a similar appearance to the specific type of object and existing in the areas other than the predetermined search area in more than one frame.

In the case where the field of view of the image pickup device 100 is variable, for example, the information on the position in the field of view may include the shooting direction and the position in the constituent frame. In addition, in the case where more than one image pickup device can take an image of a wider, continuous field of view than a single image pickup device, the information on the position in the field of view may include the shooting direction of each image pickup device and the position in the image taken by each image pickup device.

6. Additional Matters

It is possible to arbitrarily combine the features of two or more of the embodiments explained before.

What is claimed is:

1. An image encoding apparatus for encoding data of an inputted image and outputting encoded image data, comprising:
    an image-size-condition storage which stores an image-size condition including image size and target sharpness;
    an image-size reduction unit which produces a reduced image of said inputted image having said image size included in said image-size condition stored in the image-size-condition storage;
    a sharpness calculation unit which calculates sharpness of said reduced image; and
    an image-size control unit which reduces said image size included in said image-size condition stored in the image-size-condition storage and makes said image-size reduction unit further reduce said inputted image to the reduced image size, when the sharpness of said reduced image calculated by the sharpness calculation unit is higher than said target sharpness.

2. An image encoding apparatus according to claim 1, wherein until the sharpness of the further reduced image reaches said target sharpness, said image-size control unit makes repeats an operation of reducing the image size included in said image-size condition stored in the image-size-condition storage, and an operation of making said image-size reduction unit further reduce said inputted image to the reduced image size.

3. An image encoding apparatus according to claim 1, further comprising a region-of-interest detection unit which detects from one of said inputted image and said reduced image a plurality of regions of interest respectively receiving different degrees of interest, and a region-of-interest separation unit which separates region-of-interest images respectively representing said plurality of regions of interest from said one of said inputted image and said reduced image; and
    said image-size-condition storage separately stores target degrees of sharpness respectively set for the region-of-interest images; and
    said image-size control unit determines image-size conditions respectively set for the plurality of regions of interest, and obtains a plurality of ROI-based reduced images respectively in correspondence with the plurality of regions of interest, where each of the plurality of ROI-based reduced images represents said inputted image and has sharpness equal to one of the target degrees of sharpness corresponding to said each of the plurality of ROI-based reduced images.

4. An image encoding apparatus according to claim 1, wherein said image-size-condition storage further stores predetermined candidate values of an index indicating said image size.

5. An image encoding apparatus according to claim 3, wherein said plurality of regions of interest include at least one of a region of a human head, a region of a human body, a motion region, and a background region.

6. An image encoding apparatus according to claim 5, wherein said plurality of regions of interest include at least two of the region of the human head, the region of the human body, the motion region, and the background region, and said different degrees of interest are set so as to decrease in the order of the region of the human head, the region of the human body, the motion region, and the background region.

7. An image encoding apparatus according to claim 3, wherein said inputted image constitutes a video image; and said image encoding apparatus further comprises an interframe-compression-condition storage which stores an interframe-compression condition as a condition for compressing a portion of said video image corresponding to each of the plurality of regions of interest along a time direction, and an interframe compression unit which compresses the video image along the time direction in accordance with the interframe-compression condition.

8. An image encoding apparatus according to claim 7, wherein said interframe-compression condition for said each of the plurality of regions of interest indicates a compression ratio of the video image along the time direction; and said interframe-compression condition is set so that compression ratios for the plurality of regions of interest decrease in ascending order of the different degrees of interest.

9. An image encoding apparatus according to claim 8, wherein said interframe-compression condition includes a skip macroblock, and said interframe compression unit lowers a frame rate by changing a macroblock type into the skip macroblock.

10. An image encoding apparatus according to claim 9, wherein said interframe-compression condition is set so that a rate at which the macroblock type is changed into the skip macroblock in said each of the plurality of regions of interest is relatively low when one of the different degrees of interest in said each of the plurality of regions of interest is relatively high.

11. An image encoding apparatus according to claim 3, further comprising a quantization control unit which differentiates manners of quantization of said plurality of ROI-based reduced images respectively according to image sizes of said plurality of ROI-based reduced images.

12. An image encoding apparatus according to claim 11, wherein said quantization control unit determines, according to said image sizes of the plurality of ROI-based reduced images, whether to quantize only one of the plurality of ROI-based reduced images by using a first set of different quantization conditions respectively corresponding to said plurality of regions of interest and determining compression ratios in quantization, or to quantize the plurality of ROI-based reduced images by using a second set of different quantization conditions respectively corresponding to said plurality of regions of interest and determining compression ratios in quantization.

13. An image encoding apparatus according to claim 12, further comprising a quantization-condition storage which stores said first set of different quantization conditions and said second set of different quantization conditions, and a quantization unit which quantizes said plurality of ROI-based reduced images on the basis of the first set of different quantization conditions or the second set of different quantization conditions; and said quantization control unit compares the image sizes of said plurality of ROI-based reduced images, makes the quantization unit quantize only one of the plurality of ROI-based reduced images under said first set of different quantization conditions in the case where all of the image sizes of the plurality of ROI-based reduced images are identical, and makes the quantization unit quantize the plurality of ROI-based reduced images under said second set of different quantization conditions in the case where the image sizes of the plurality of ROI-based reduced images are not all identical.

14. An image encoding apparatus according to claim 13, further comprising a dequantization unit which dequantizes the plurality of ROI-based reduced images quantized by said quantization unit, and an image-quality calculation unit which calculates image quality of each of the plurality of ROI-based reduced images obtained by dequantization ion by the dequantization unit; said quantization conditions include a predetermined target image quality level and a quantization parameter for said each of the plurality of regions of interest; and said quantization control unit repeats an operation of changing said quantization parameter and making the quantization unit quantize said each of the plurality of ROI-based reduced images on the basis of the changed quantization parameter until the image quality of said each of the plurality of ROI-based reduced images calculated by the image-quality calculation unit reaches the predetermined target image quality level.

15. An image encoding apparatus according to claim 14, wherein said predetermined target image quality level is represented by a threshold of a linear sum of a block noise amount and an edge amount.

16. An image encoding apparatus according to claim 14, wherein said image-size condition stored in said image-size-condition storage further includes image quality of said inputted image as target image quality; and said image encoding apparatus further comprises an additional image-size control unit which reduces the image size included in said image-size condition stored in the image-size-condition storage and makes said image-size reduction unit produce another reduced image of the inputted image so that said another reduced image has the image size reduced by the additional image-size control unit and image quality of said another reduced image is equal to or higher than the target image quality, before said image-size control unit reduces said image size in the image-size condition and makes said image-size reduction unit produce said reduced image of the inputted image.

17. An image encoding process for encoding data of an inputted image and outputting encoded image data, comprising:
    storing in an image-size-condition storage an image-size condition including image size and target sharpness;
    producing a reduced image of said inputted image having said image size included in said image-size condition stored in the image-size-condition storage;
    calculating sharpness of said reduced image; and
    when the calculated sharpness of the reduced image is higher than said target sharpness, further reducing the image size included in said image-size condition stored in the image-size-condition storage and reducing said inputted image to the reduced image size.

18. A computer-readable non-transitory medium storing an image encoding program for encoding data of an inputted image and outputting encoded image data, said image encoding program realizes in a computer:
    an image-size-condition storage which stores an image-size condition including image size and target sharpness;
    an image-size reduction unit which produces a reduced image of said inputted image having said image size included in said image-size condition stored in the image-size-condition storage;
    a sharpness calculation unit which calculates sharpness of said reduced image; and
    an image-size control unit which reduces said image size included in said image-size condition stored in the image-size-condition storage and makes said image-size reduction unit further reduce said inputted image to the reduced image size, when the sharpness of said reduced image calculated by the sharpness calculation unit is higher than said target sharpness.

* * * * *